(12) United States Patent
Fowler et al.

(10) Patent No.: US 9,973,455 B1
(45) Date of Patent: May 15, 2018

(54) MESSAGE CUSTOMIZATION AND ROUTING

(71) Applicant: HCA Holdings, Inc., Nashville, TN (US)

(72) Inventors: David Fowler, Brentwood, TN (US); Milind Madhukar Borkar, Franklin, TN (US); Thomas Andrew Doyle, Franklin, TN (US); Alan Scott, Franklin, TN (US); William Michael Gregg, Nashville, TN (US); Jim Najib Jirjis, Nashville, TN (US); Jonathan Perlin, Nashville, TN (US); Paul Martin Paslick, Nashville, TN (US); Paul Currie, Franklin, TN (US)

(73) Assignee: HCA Holdings, Inc., Nashville, TN (US)

( * ) Notice: Subject to any disclaimer, the term of this patent is extended or adjusted under 35 U.S.C. 154(b) by 0 days. days.

(21) Appl. No.: 15/476,243

(22) Filed: Mar. 31, 2017

Related U.S. Application Data

(60) Provisional application No. 62/316,213, filed on Mar. 31, 2016.

(51) Int. Cl.
*G06F 15/16* (2006.01)
*H04L 12/58* (2006.01)

(52) U.S. Cl.
CPC ............ *H04L 51/043* (2013.01); *H04L 51/04* (2013.01); *H04L 51/30* (2013.01)

(58) Field of Classification Search
CPC ....... H04L 51/04; H04L 51/043; H04L 51/30; G06F 21/604
USPC .......................................... 709/206; 705/2, 3
See application file for complete search history.

(56) References Cited

U.S. PATENT DOCUMENTS

| | | | | |
|---|---|---|---|---|
| 2005/0063365 A1* | 3/2005 | Mathew | ................. | G06Q 10/10 370/352 |
| 2005/0076110 A1* | 4/2005 | Mathew | ................. | G06Q 10/06 709/223 |
| 2014/0180711 A1* | 6/2014 | Kamen | ................. | G06Q 10/06 705/2 |
| 2015/0244687 A1* | 8/2015 | Perez | ................. | H04L 63/0428 726/4 |

\* cited by examiner

*Primary Examiner* — Frantz Jean
(74) *Attorney, Agent, or Firm* — Kilpatrick Townsend & Stockton

(57) ABSTRACT

In some examples, a service-based system for managing message routing and customization is provided. The service-based system includes an information exchange service bus and an information exchange engine. The system is configured to manage inbound and outbound messages. The system is also configured to tailor messages based on source entities, destination entities, and other users such as dependent users.

20 Claims, 13 Drawing Sheets

MESSAGE CUSTOMIZATION AND ROUTING

BACKGROUND

This specification relates in general to managing inbound and outbound messages in a network environment and, but not by way of limitation, to managing generation of tailored messages.

The amount of data generated each day continues to grow. In some environments, some of this data may be stored, while a majority of it may be evaluated and abandoned or ignored. Users and computing devices are beginning to rely more and on this data to make decisions. This may be especially true when the data is introduced as part of an operational flow. However, the time required to sort through stored data can create inefficiencies and the fact that other data may typically be ignored or abandoned may create undesirable outcomes.

BRIEF DESCRIPTION OF THE DRAWINGS

Various examples in accordance with the present disclosure will be described with reference to the drawings, in which.

DETAILED DESCRIPTION

The ensuing description provides preferred exemplary examples(s) only, and is not intended to limit the scope, applicability, or configuration of the disclosure. Rather, the ensuing description of the preferred exemplary examples(s) will provide those skilled in the art with an enabling description for implementing a preferred exemplary example. It is understood that various changes may be made in the function and arrangement of elements without departing from the spirit and scope as set forth in the appended claims.

Figure 1:
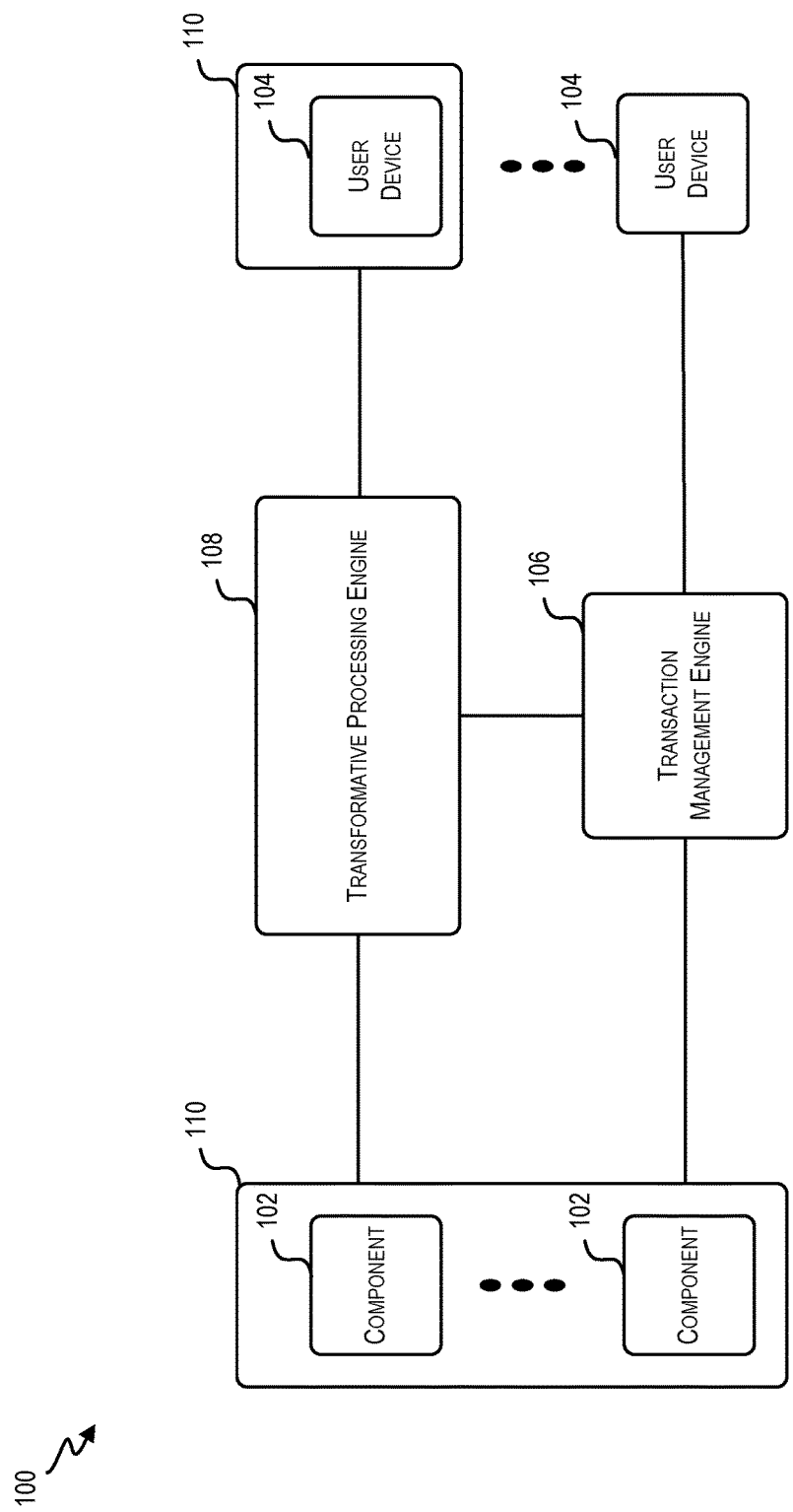
FIG. 1 is an example block diagram illustrating an environment in which techniques relating to managing message flow and message customization as described herein may be implemented, according to at least one example.

Referring first to FIG. 1, a block diagram of an example of an interaction system 100 is illustrated. Generally, in interaction system 100, data can be generated at one or more system components 102 and/or user devices 104. Transaction management engine 106 can manage the flow of communications within interaction system. Transformative processing engine 108 can receive, intercept, track, integrate, process, and/or store such data.

Data flowing in interaction system 100 can include a set of communications. Each of one, some of all communications can include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include protected information.

For example, a system component 102 can include, for example, a sensor to detect a sensor measurement and can thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity (e.g., person) near the sensor. The communication may then include an identifier of the object or entity. The identifier can be determined, for example, based on detection of a nearby electronic tag (e.g., RFID tag), a detected user input received at a user interface of component 102, and/or data in a corresponding communication received from a user device.

As another example, a user device 104 can be configured to detect user input received at a user interface of the device. The user input can include, for example, an identifier of an object or entity, an instruction, a characterization of an object or entity, an identification of an assessment to be performed, a specification of an aggregation or data processing to be performed, and/or an identification of a destination for a data-analysis report. User device 104 can further be configured to detect user input requesting particular data, to generate a request communication (e.g., to be sent to transformative processing engine), to receive the requested data and/or to present the received data.

Data can include information that identifies a person, such as personal information and/or demographic information. For example, the information can identify a person's name, age, sex, race, physical address, phone number, email address, and/or social security number. Data may include information collected by a government agent, employer, insurer, or school or university, that relates to a past, present, or future condition or status (e.g., pertaining to employment, political involvement, occupation, health, or financial status) of any individual. For example, data may include information about past events.

Data may identify an entity being evaluated and/or one at least partly performing an evaluation. For example, a communication may identify a first company as one being evaluated and a second company as one evaluating a quality of a product of the first company. As another example, a communication may identify a first service plan of a first company as one providing an Internet network and may identify one or more users providing speed checks over the network.

The depicted engines, devices and/or components can communicate over one or more networks. A network of one or more networks can include a wired network (e.g., fiber, Ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), local area network, the Internet and/or a combination thereof. It will be appreciated that, while one or more components 102 and one or more user devices 104 are illustrated as communicating via transformative processing engine 108 and/or transaction management engine 106, this specification is not so limited. For example, each of one or more components 102 may communicate with each of one or more user devices 104 directly via other or the same communication networks.

A component 102 can be configured to detect, process and/or receive data, such as environmental data, geophysical data, biometric data, chemical data (e.g., chemical composition or concentration analysis data), and/or network data. The data can be based on data detected, for example, via a sensor, received signal or user input. A user device 104 can include a device configured to receive data from a user and/or present data to a user. It will be appreciated that, in some instances, a component 102 is also a user device 104 and vice-versa. For example, a single device can be configured to detect sensor measurements, receive user input and present output.

A component 102 can be configured to generate a communication that is in one or more formats, some of which can be proprietary. For example, an imaging machine (e.g., one of one or more components 102) manufactured by company A, located within a first facility (e.g., facility 110), and belonging to a first client, may save and transfer data in a first format. An imaging machine (e.g., one of one or more components 102) manufactured by company B, located within the first facility (e.g., facility 110), and belonging to the first client, may save and transfer data in a second format. In some examples, data from certain components is transformed, translated, or otherwise adjusted to be recognizable by transformative processing engine 108. Thus, continuing with the example from above, when the imaging machines manufactured by companies A and B are located within the first facility belonging to the first client, they may nevertheless save and transfer data in different formats. In some examples, one or more components 102 communicate using a defined format.

In some examples, each of one or more components 102 are each associated with one or more clients within a same or different interaction systems. For example, certain ones of one or more components 102 may be associated with a first client, while other ones of one or more components 102 may be associated with a second client. Additionally, each of one or more components 102 may be associated with a facility 110 (e.g., client facility). Each facility 110 may correspond to a single location and/or processing focus. Exemplary types of facilities include server farm facilities, web-server facilities, data-storage facilities, technical-support facilities, telecommunication facilities, care facilities, and/or business operation facilities. For example, a first facility may include a structure at a first location at which one or more resources (e.g., computational resources, equipment resources, laboratory resources, and/or human resources) are provided. Each of the one or more resources may be of a first type in a first set of types. A resource type can be identified based on, for example, a characteristic of the resource (e.g., sensor inclusion) and/or a capability of providing each of one or more services. Thus, for example, resources at a first facility may be better configured for handling a particular type of service requests compared to those in another facility. As another example, different facilities may include resources of similar or same types but may vary in terms of, for example, user accessibility, location, managing client, etc.

Transmission of data from one or more components 102 to transformative processing engine 108 may be triggered by a variety of different events. For example, the data may be transmitted periodically, upon detection of an event (e.g., completion of an analysis or end of a procedure), upon detection of an event defined by a rule (e.g., a user-defined rule), upon receiving user input triggering the transmission, or upon receiving a data request from transformative processing engine 108. Each transmission can include, e.g., a single record pertaining to a single entity, object, procedure, or analysis or multiple records pertaining to multiple entities, objects, procedures, or analyses.

In some examples, at least some of one or more user devices 104 are associated with facility 110. In some examples, at least some of one or more user devices 104 need not be associated with facility 110 or any other facility. Similar to one or more components 102, one or more user devices 104 may be capable of receiving, generating, processing, and/or transmitting data. Examples of one or more user devices 104 include, for example, a computer, a mobile device, a smart phone, a laptop, an electronic badge, a set-top box, a thin client device, a tablet, a pager, and other similar user devices). One or more user devices 104 may be configured to run one or more applications developed for interacting with data collected by transformative processing engine 108. For example, those user devices of one or more user devices 104 that are not associated with facility 110 may be configured to run one or more third-party applications that may rely in part on the data gathered by transformative processing engine 108.

Each of one or more components 102 and one or more user devices 104 may be utilized by one or more users (not shown). Each of the one or more users may be associated with one or more clients. For example, one of the one or more users can be associated with a client as a result of being employed by the client, physically located at a location of the client, being an agent of the client, or receiving a service from the client.

In some examples, one or more components 102 and one or more user devices 104 may communicate with transformative processing engine 108 and transaction management engine 106 via different information formats, different proprietary protocols, different encryption techniques, different languages, different machine languages, and the like. As will be discussed with reference to FIG. 2, transformative processing engine 108 is configured to receive these many different communications from one or more components 102, and in some examples from one or more user devices 104, in their native formats and transform them into any of one or more formats. The received and/or transformed communications can be transmitted to one or more other devices (e.g., transaction management engine 106, an entity device, and/or a user device) and/or locally or remotely stored. In some examples, transformative processing engine 108 receives data in a particular format (e.g., the HL7 format) or conforming to any other suitable format and/or is configured to transform received data to conform to the particular format.

One or more components 102 of facility 110 can include and/or has access to a local or remote memory for storing generated data. In some examples, the data is stored by one or more servers local to facility 110. Such storage may enable facility 110 to retain locally data pertaining to its facility prior to (or in conjunction with) the data being shared with transformative processing engine 108 and/or transaction management engine 106. In some examples, the one or more servers of facility 110 share data directly with a record service (not shown), and the record service makes the data available to transformative processing engine 108 and/or transaction management engine 106. Once an electronic record is updated at facility 110, an indication of the update may be provided to the record service. The record service may then update a corresponding record associated with the electronic record.

The record service can be granted access to the data generated and/or transmitted by one or more components 102. In some examples, the record service includes a server or a plurality of servers arranged in a cluster or the like. These server(s) of the record service can process and/or store data generated by one or more components 102. For example, one or more records can be generated for each entity (e.g., each record corresponding to a different entity or being shared across entities). Upon receiving a communication with data from a component (or facility), the record service can identify a corresponding record and update the record to include the data (or processed version thereof). In some examples, the record service provides data to transformative processing engine 108.

Facility 110 can include one at which a resource is located and/or service is provided. Irrespective of the type of facility, facility 110 may update data, maintain data, and communicate data to transformative processing engine 108. At least some of the data may be stored local to facility 110.

A user interacting with a user device 104 can include, for example, a client customer, client agent and/or a third party. A user may interact with user device 104 and/or component 102 so as to, for example, facilitate or initiate data collection (e.g., by a component 102), provide data, initiate transmission of a data request, access data and/or initiate transmission of a data-processing or data-storage instruction. In some instances, one or more user devices 104 may operate according to a private and/or proprietary network or protocols. In other examples, one or more user devices 104 may operate on public networks. In any case, however, transformative processing engine 108 can have access to the one or more components and can communicate with them via a public, private, and/or proprietary network or protocols. The use of one or more private and/or proprietary protocols can promote secure transfer of data.

Figure 2:
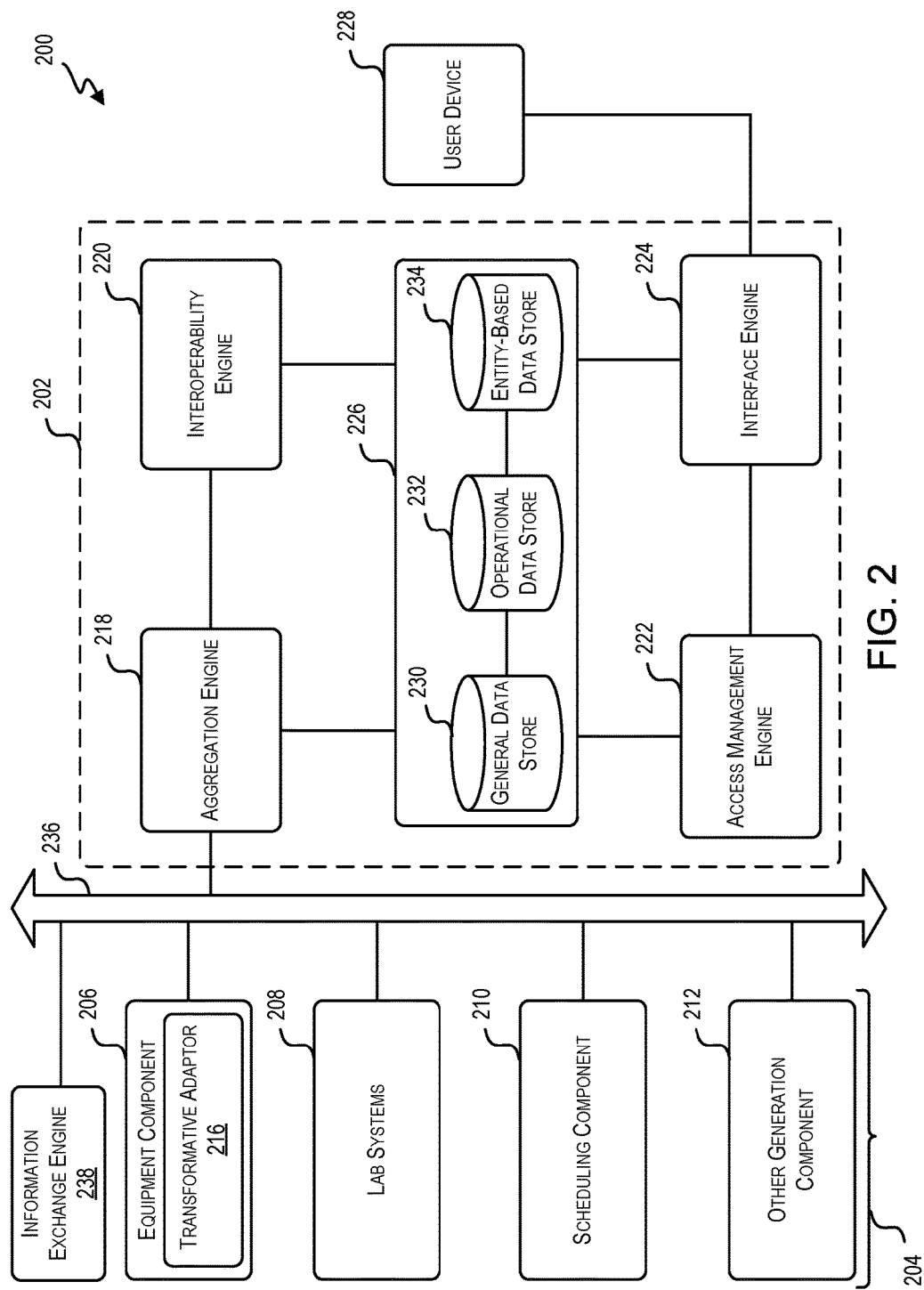
FIG. 2 is an example block diagram illustrating an environment in which techniques relating to managing message flow and message customization as described herein may be implemented, according to at least one example.

Referring next to FIG. 2, a block diagram of an example of an interaction system 200 is shown. Interaction system 200 includes a transformative processing engine 202. Transformative processing engine 202 is an example of transformative processing engine 108 discussed with reference to FIG. 1. Interaction system 200 also includes one or more generation components 204. In particular, one or more generation components 204 include an equipment component 206, a lab systems component 208, a scheduling component 210, and other generation component 212. One or more generation components 204 are examples of one or more components 102 discussed with reference to FIG. 1. In some examples, the data may pass to the transformative processing engine 202 via an information exchange service bus 236 (e.g., an enterprise service bus). In some examples, only a portion of the is passed via the information exchange service bus 236, while other portions are passed directly to the transformative processing engine 202 without first passing over the information exchange service bus 236.

Generally, one or more generation components 204 includes any suitable device or system capable of generating data in the context of an interaction system. For example, the other generation component 212 may include a sensor on a door, and equipment component 206 may include a sophisticated computer-controlled laser device. In either case, each generation component generates some type of data. For example, the data provided by the sensor may be used to address security concerns or assessing heating, ventilating, and air conditioning (HVAC) costs for an institution. The data provided by the laser device may have been provided while engaged in a procedure and may then be used by other entities in the future to decide how to use the device.

As discussed in further detail herein, data generated by one or more generation components 204 can be of a variety of formats, some of which may be proprietary. For example, a single component can generate data in multiple formats, different components can generate data in different formats, and/or different component types can result in generation of data in different formats. In some instances, formatting of a data can depend on a service having been provided, a user initiating data generation, a destination to receive the data, a location at which a service was provided, etc. In some examples, a typical interaction system includes thousands of generation components producing data in hundreds of formats. In order to harness the power that comes from such a large amount of data to make informed decisions, it is desirable that all, or at least a large portion of the data, is shared. Use of transformative processing engine 202 in accordance with techniques described herein may achieve this design—making large amounts of data, in many different originating formats available to various types of users, via one or more interfaces. At least a portion of the data generated by the generation components 204 may be provided to the transformative processing engine 202. In some examples, each generation component 204 includes an agent that executes on the generation components 204 and determines which data to send to the transformative processing engine 202 and other engines described herein. In some examples, the generation components 204 provide data to the transformative processing engine 202 via a messaging bus (e.g., an information exchange service bus 236). The messaging bus, which may be included in the transformative processing engine 202 or separate, is able to see data that moves throughout the interaction system 200. The information exchange service bus 236 also includes a subscription registry that can be used to manage subscriptions to the information exchange service bus 236 for certain data (e.g., data having certain characteristics). The information exchange service bus 236 may send and/or direct data to certain other entities when appropriate as indicated by subscription records in the registry.

While one or more generation components 204 are illustrated adjacent to each other, it is understood that each may be located within one facility or that the components may be spread out among many facilities. In addition, in some examples, one or more generation components 204 belong to different clients.

Turning now to equipment component 206, this component includes any machine, contrivance, implant, or other similar related article, that is intended to aid in reaching a particular objective. In some instances, equipment component 206 includes one or more sensors to detect environmental or other stimuli. Equipment component 206 can include, for example, equipment to monitor a stimulus, detect stimulus changes, detect stimulus-indicative values, and so on. Exemplary equipment components 206 include an imaging device, a device that detects and characterizes electrical signals, a device that detects pressure, and/or a device that detects concentration of one or more particular elements, compounds and/or gases.

As illustrated, equipment component 206 includes transformative adaptor 216. In some examples, transformative adaptor 216 is a device that transforms, translates, converts, or otherwise adjusts output data from equipment component 206. For example, an equipment component 206 can be a scanner that outputs its results in format A, but the majority of other scanners in the interaction system output their results in format B. Transformative adaptor 216 may be implemented to convert or otherwise adjust the results in format A to conform closer to format B. For example, the conversion from format A to format B may be performed using a conversion rule, which may be user-define or learned. Transformative processing engine 202 may perform similar tasks as it relates to all data generated within interaction system 200. In this manner, transformative adaptor 216 can perform an initial step in the process of transformation, translation, conversion, or adjustment of the output of equipment component 206. In some examples, transformative adaptor 216 is implemented in hardware, software, or any suitable combination of both. In some examples, other transformative adaptors (not shown) may be implemented within others of one or more generation components 204. In some examples, equipment component 206 may not include transformative adaptor 216.

Lab systems component 208 includes any suitable laboratory equipment or system that is intended to analyze material, such as biological material. This includes, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative processing engine 202.

Scheduling component 210 includes any suitable computing devices used for business-related purposes with respect to interaction system 200. For example, scheduling component 210 can be configured to schedule a resource for allocation for a particular entity during a particular time slot. Scheduling component 210 can monitor a schedule for the resource and can identify one or more available time slots that may be secured by a particular entity. Upon receiving a scheduling indication, scheduling component 210 may update a schedule of a resource to reflect that a particular time slot is to be allocated for service of a particular entity.

Each of one or more generation components 204 and the user device 228 may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and can include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems, and may also be configured to execute such program code. The one or more processors can be implemented as one or more integrated circuits, e.g., one or more single-core or multi-core microprocessors or microcontrollers, examples of which are known in the art. In operation, the one or more processors can control the operation of the particular component. The one or more processors may access and execute the program code and at any given time.

The user interface can include any combination of input and output devices. In some instances, a user can operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative processing engine 202 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative processing engine 202. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative processing engine 202 in accordance with techniques described herein. In some examples, the sensors may also be configured to detect the component's or the user device's location and other details about the component or the user device. In some examples, the component and user device may include global positioning chips for determining a geolocation. Such geolocation information may be relevant to analyzing the data provided by the component or the user device located at the geographic location.

Transformative processing engine 202 includes an aggregation engine 218, an interoperability engine 220, an access management engine 222, an interface engine 224, and a data store 226. Generally aggregation engine 218 is configured to collect data from multiple communications. The data may be from one or multiple generation components 204 and/or may be of same or different formats. Aggregation engine 218 may be configured to perform one or more operations on the collected data. For example, aggregation engine 218 may tag data, log data, perform protocol conversion, and may support one-to-many communications. The collection may be asynchronous. In some examples, the data has been saved locally in connection with one or more generation components 204 in many different formats having many different data structures.

Aggregation engine 218 can identify data to be aggregated based on, for example, intra-communication data, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 218 can be configured to provide data from one or more communications to interoperability engine 220. Interoperability engine 220 can be configured to perform one or more operations on the received data and store it in data store 226. For example, interoperability engine 220 may perform semantic tagging and indexing of data. This may include extracting field values from data, categorizing data (e.g., by type of data, characteristic of an entity, location of facility, characteristic of facility, and the like), anonymizing or partially-anonymizing data, and the like. Interoperability engine 220 may also include a high availability cache, an alerts engine, and a rules engine. In some examples, interoperability engine 220 operates synchronously.

From interoperability engine 220, data flows to data store 226. Data store 226 (and any other data store discussed herein) may include one or more data stores, which may be distributed throughout two or more different locations (e.g., present on different devices, which can include devices of different entities and/or a cloud server). In some examples, data store 226 includes a general data store 230, an operational data store 232, and an entity-based data store 234. Within each of the data stores 230, 232, and 234 is stored data. Depending on the structure of the particular data store, certain data stores may include rules for reading and writing. The data stores 230, 232, and 234 may include records, tables, arrays, and the like, which may be relational or non-relational. Depending on the data store, records for individual entities, business and analytics information, output data from one or more generation components 204, and the like may be retained. The data within the data stores 230, 232, and 234 include elements or tags such that a particular data (e.g., for a single entity, protocol, etc.) can be retrieved.

Access management engine 222 is configured to manage access to features of transformative processing engine 202, including access to the data retained in data store 226. For example, access management engine 222 may verify that a user device such as user device 228 is authorized to access data store 226. To verify the user device 228, access management engine 222 may require that a user of the user device 228 input a username and password, have a profile associated with the interaction system, have paid a subscription fee associated with access to data store 226, and the like. Access management engine 222 may also verify that the user device 228 has an IP address or geographical location that corresponds to an authorized list, that the user device 228 includes a plug-in for properly accessing the data store 226, that the user device 228 is running certain applications required to access the data store 226, and the like.

Interface engine 224 is configured to retrieve the data from data store 226 and provide one or more interfaces for interacting with elements of transformative processing engine 202. For example, interface engine 224 includes an interface by which an application running on user device 228 can access portions of data within data store 226.

As described herein, an information exchange engine 238 shares a network connection with the information exchange service bus 236. The information exchange engine 238 is configured to monitor data (e.g., messages) that is passed over the information exchange service bus 236 and, from the monitored data, select certain portions to provide to one or more authorized users (e.g., dependent users, friends and family members of dependent users, professional users, and other suitable authorized users). The information exchange engine 238 is also configured to route inbound messages and route outbound messages, as described herein. The information exchange engine 238 is also configured to generate customized messages based on dependent user data and professional users.

Figure 3:
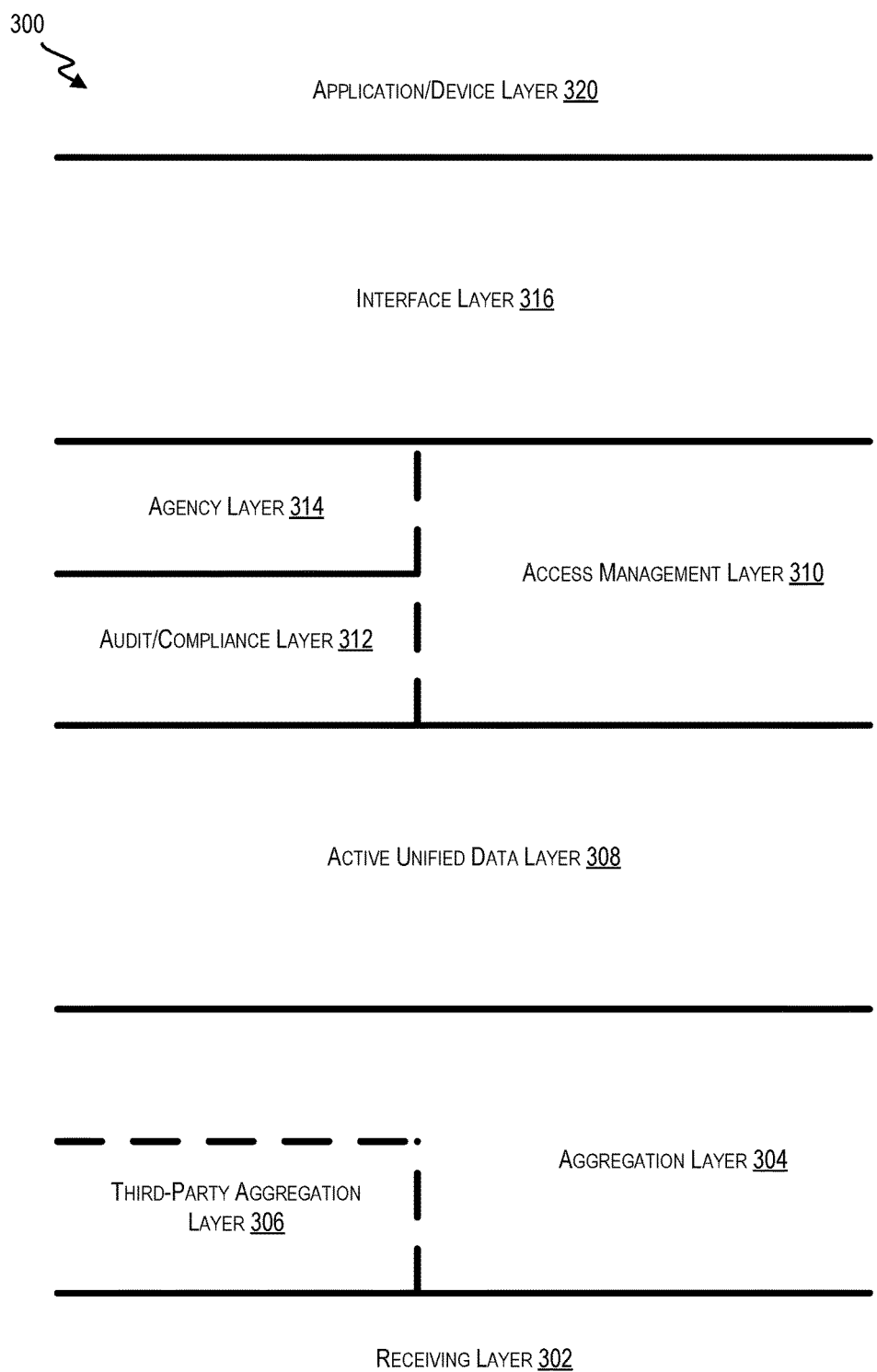
FIG. 3 is an example schematic model illustrating a network communication model in which techniques relating to managing message flow and message customization as described herein may be implemented, according to at least one example.

Turning next to FIG. 3, an architecture stack 300 is shown. In some examples, techniques relating management of data are implemented in accordance with architecture stack 300. And while architecture stack 300 is illustrated as having a particular structure, it is understood that other structures, including those with more or less layers than illustrated, is within the scope of this specification. In some examples, architecture stack 300 is implemented across an interaction system having a plurality of systems belonging to the same client or spread across different clients. Thus, architecture stack 300 can be used to integrate different systems of different organizations, entities, and the like and to provide a fluid sharing of information among elements within the interaction system and without the interaction system. In some instances, a multi-layer part of architecture stack 300 is implemented at a single system or device within an interaction system.

The different layers of architecture stack 300 will be described generally with reference to FIG. 3 and in detail with reference to subsequent figures. Architecture stack 300 includes a receiving layer 302 as the bottom-most layer. Receiving layer 302 includes receiving data from elements that share data with other elements within an aggregation layer 304. For example, as detailed herein, receiving layer 302 can include receiving data from generation components that generate data. As such, receiving layer 302 is where data that has been created is received. In some examples, the data within receiving layer 302 may be in its raw formats. The output may then be transmitted to aggregation layer 304. In some examples, components of receiving layer 302 may have complimentary layers to facilitate data transfer. For example, the components may include a data generation and/or a data transmission layer for providing data to receiving layer 302.

Elements of aggregation layer 304 aggregate the data generated by the elements of receiving layer 302. For example, the elements of aggregation layer 304 may include aggregation engines that collect data from generation components located within receiving layer 302. Such aggregation may be performed periodically, in response to a user request, according to a schedule, or in any other suitable manner. In some examples, data of aggregation layer 304 may be aggregated according to input and/or rules and may aggregate across records pertaining to, e.g., a facility, entity, time period, characteristic (e.g., demographic characteristic or condition), outcome, and any other suitable input and/or rules. The aggregation may include compiling the data, generating a distribution, generating a statistic pertaining to the data (e.g., average, median, extremum, or variance), converting the data, transforming the data to different formats, and the like.

Next, architecture stack 300 includes an active unified data layer 308. Elements of active unified data layer 308 receive data from the elements of the other layers and store such data in a unified manner. In some examples, this may include storing the data in a manner that allows for later searching and retrieval using a defined set of method calls, techniques, and or procedures. For example, the data may be stored such that a different application can access the data in a standard or unified manner. Thus, elements of active unified data layer 308 may receive information collected or generated within aggregation layer 304 and make certain adjustments to the data (e.g., translations, tagging, indexing, creation of rules for accessing the data, conversion of formatting of the data, generation of compressed versions, and the like) prior to retaining the data within one or more data stores accessible within active unified data layer 308.

Architecture stack 300 also includes an access management layer 310, which can include an audit/compliance layer 312 and/or an agency layer 314. Access management layer 310 includes elements to manage access to the data. For example, access management layer 310 may include elements to verify user login credentials, IP addresses associated with a user device, and the like prior to granting the user access to data stored within active unified data layer 308.

Audit/compliance layer 312 includes elements to audit other elements of architecture stack 300 and ensure compliance with operating procedures. For example, this may include tracking and monitoring the other elements of access management layer 310.

Agency layer 314 includes an access location (e.g., a virtual private network, a data feed, or the like) for elements of agencies that are interested in the operations of the interaction system in which architecture stack 300 is implemented. For example, agency layer 314 may allow a governmental entity access to some elements within architecture stack 300. This may be achieved by providing the governmental entity a direct conduit (perhaps by a virtual private network) to the elements of access management layer 310 and the data within active unified data layer 308. Audit/compliance layer 312 and agency layer 314 are sub-layers of access management layer 310.

Architecture stack 300 also includes interface layer 316. Interface layer 316 provides interfaces for users to interact with the other elements of architecture stack 300. For example, clients, entities, administrators, and others belonging to the interaction system may utilize one or more user devices (interacting within application/device layer 320) to access the data stored within active unified data layer 308. In some examples, the users may be unrelated to the interaction system (e.g., ordinary users, research universities, for profit and non-profit research organizations, organizations, and the like) and may use applications (not shown) to access the elements within architecture stack 300 via one or more interfaces (e.g., to access data stored within active unified data layer 308). Such applications may have been developed by the interaction system or by third-parties Finally, architecture stack 300 includes application/device layer 320. Application/device layer 320 includes user devices and applications for interacting with the other elements of architecture stack 300 via the elements of interface layer 316. For example, the applications may be web-based applications, entity portals, mobile applications, widgets, and the like for accessing the data. These applications may run on one or more user devices. The user devices may be any suitable user device as detailed herein.

Figure 4:
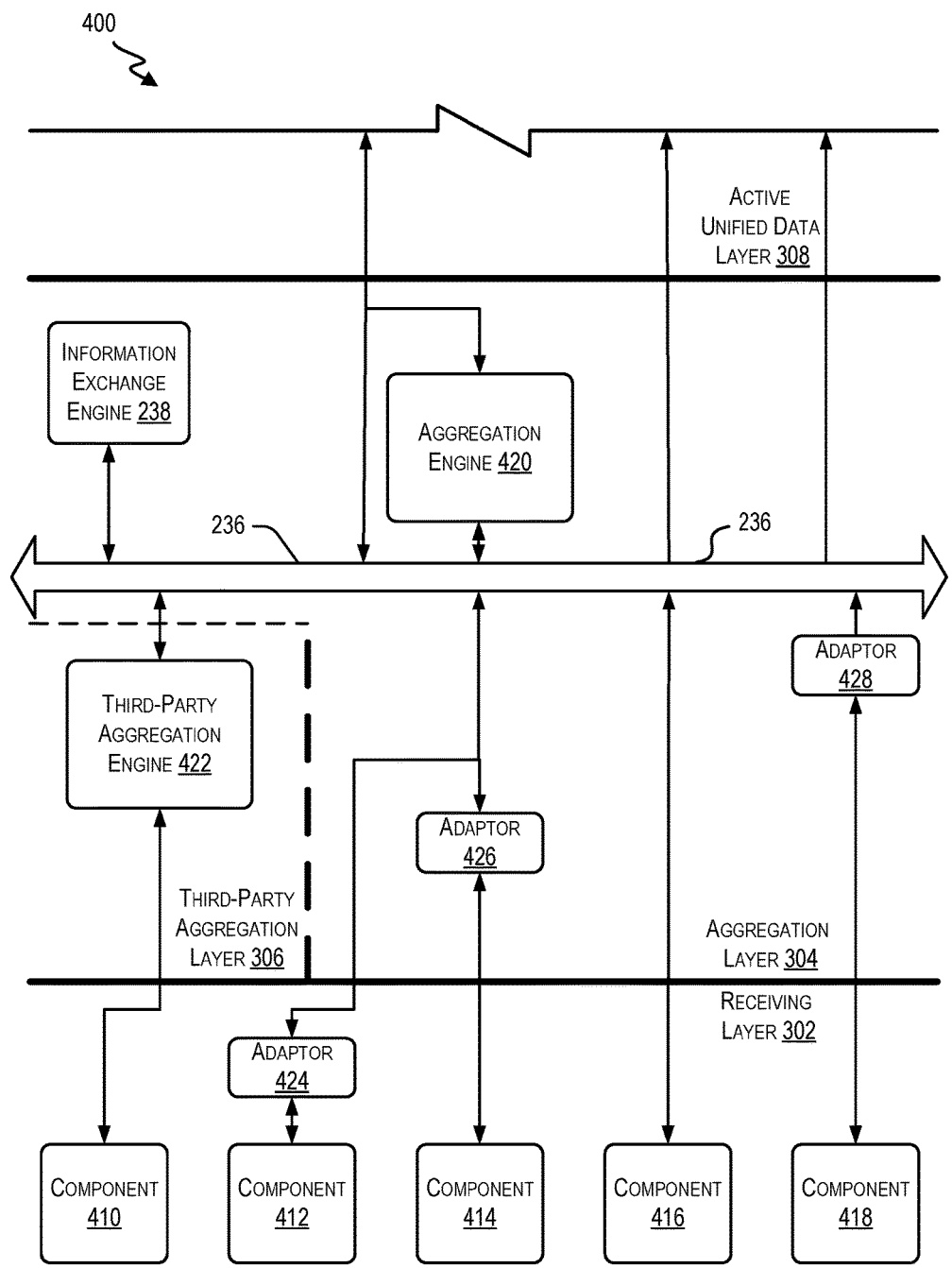
FIG. 4 is an example schematic model illustrating an aspect of the network communication model of FIG. 3 in more detail.

Turning next to FIG. 4, a diagram 400 is shown that depicts a portion of architecture stack 300 according to at least one example. In particular, the diagram 400 includes receiving layer 302, aggregation layer 304, aggregation layer 306, and a portion of active unified data layer 308. Receiving layer 302 receives data from one or more components 410-418. Components 410-418 are examples of one or more generation components 204. Components 410-418 may be spread across multiple facilities within a single or multiple clients. In some examples, components 410-418 may include complimentary layers to facilitate data transmission. For example, components 410-418 may include a transmission layer, generation layer, and/or a receiving layer to communicate data at receiving layer 302 and, in some examples, receive data from receiving layer 302.

In some instances, two or more of components 410-418 generate data according to different formats. The data can then be transformed, translated, or otherwise adjusted before an aggregation engine 420 (e.g., aggregation engine 218) or a third-party aggregation engine 422 (e.g., aggregation engine 218) collects the data. In some examples, the adjustment takes place within receiving layer 302. Thus, an adaptor 424 is associated with component 412 located in receiving layer 302. Adaptor 424 is an example of transformative adaptor 216. Adaptor 424 is implemented, as appropriate, in hardware, software, or any suitable combination of both. For example, transformative adaptor 216 may be a bolt-on adaptor that adjusts data as such data leaves component 412.

Other adaptors, such as adaptor 426 and adaptor 428, are implemented within aggregation layer 304. These adaptors can function in a similar manner as adaptor 424. In some examples, the data provided by component 414 is transmitted through adaptor 426 prior to being directed to aggregation engine 420. The data provided by component 416 is transmitted through aggregation layer 304 and/or enters aggregation engine 420 without having first traveled through an adaptor. The data provided by component 418 is transmitted through aggregation layer 304 and through adaptor 428. In some examples, component 418 provides for streaming of data. The data provided by component 410 is transmitted directly to third-party aggregation engine 422.

Aggregation engine 420 and third-party aggregation engine 422 function in a similar manner. In some examples, third-party aggregation engine 422 is operated by a different entity than the entity that operates aggregation engine 420 and may belong to different clients or a different interaction system. This may be because the data collected by third-party aggregation engine 422 differs in some way from the data collected by aggregation engine 420. In any event, aggregation engine 420 is configured to perform integration of data, including generic integration. For example, aggregation engine 420 performs one or more operations on data including tagging, logging, and protocol conversion. Aggregation engine 420 also supports one-to-many communications of data. In some examples, data flows between aggregation engine 420, the third-party aggregation engine 422, and some of components 410-418 and elements of active unified data layer 308.

The diagram 400 also includes the information exchange service bus 236 and the information exchange engine 238. As introduced herein, messages passing through the aggregation layer 304 can pass over the information exchange service bus 236. In this manner, the information exchange engine 238 can access the messages, route the messages, and/or customize the messages.

Figure 5:
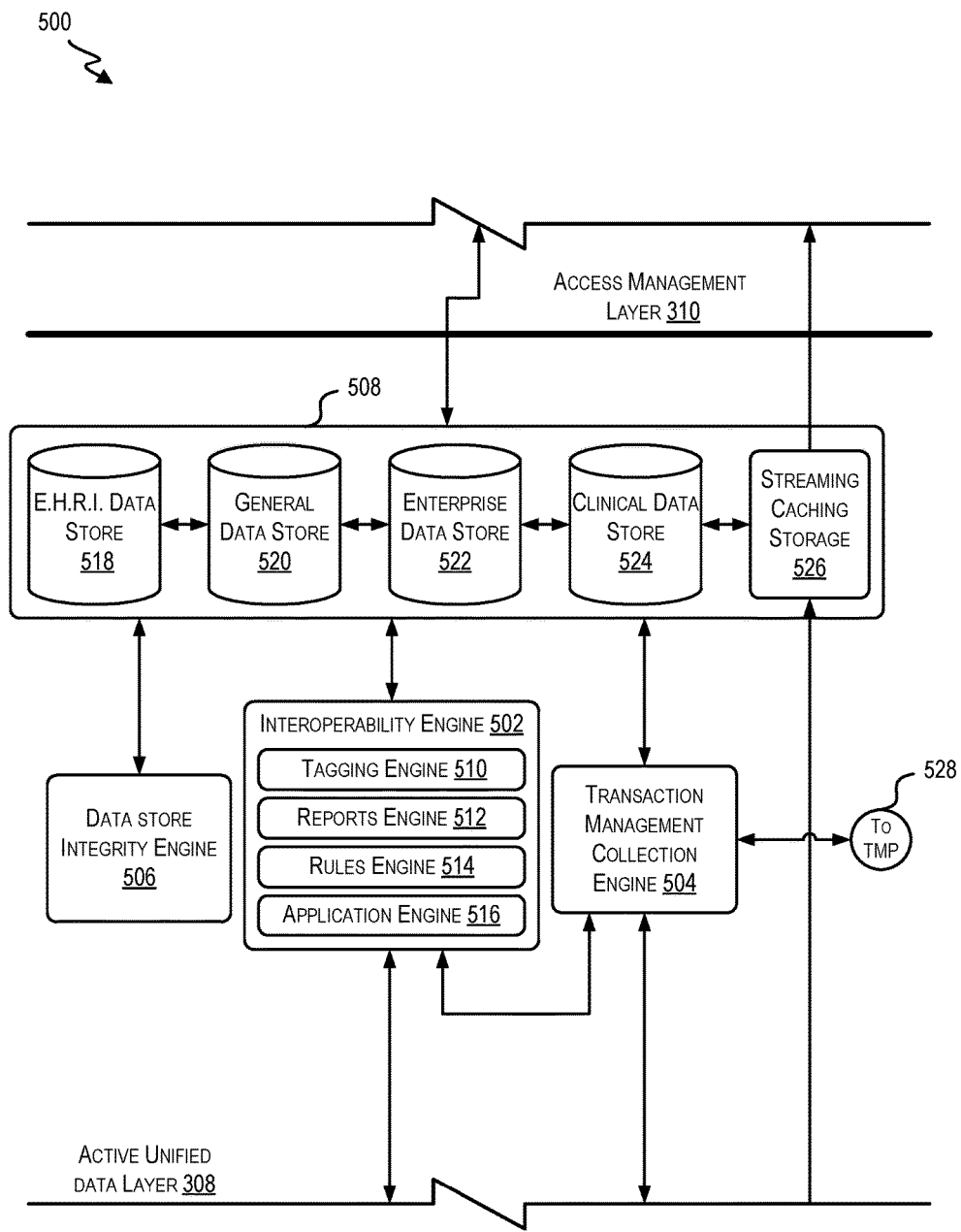
FIG. 5 is an example schematic model illustrating an aspect of the network communication model of FIG. 3 in more detail.

Referring next to FIG. 5, a diagram 500 is shown that depicts a portion of architecture stack 300 according to at least one example. In particular, diagram 500 includes active unified data layer 308 and a portion of access management layer 310. Active unified data layer 308, as illustrated in diagram 500, includes an interoperability engine 502 (e.g., interoperability engine 220), a transaction management collection engine 504, a data store integrity engine 506, and a data store 508 (e.g., data store 226). Generally, interoperability engine 502 receives data from elements within aggregation layer 304 (e.g., from aggregation engine 420) and performs one or more operations with respect to the data. Interoperability engine 502 also facilitates storage of at least a portion of the processed information in data store 508.

Transaction management collection engine 504 is implemented as part of transaction management engine 106. Transaction management collection engine 504 is configured to generate message indicators identifying flows of data by and between elements of an interaction system implemented using the techniques described herein. The flows of information include messages which include data, and the message indicators include unique message identifiers that can be used to identify the messages. The unique message identifiers include information that can be used to uniquely identify the messages. For example, a unique message identifier for a particular message can include a concatenation of the following information stored in a table: a source application, a facility, a message type, and a message control identification (ID). The unique message identifier can also be the message control ID. The unique message identifier may be created as messages including data are transmitted from aggregation layer 304.

In some examples, the table also includes information for tracking the progress of the message from an origination node to a destination node. For example, typically when a message (e.g., any communication of data) is first received by transformative processing engine 108 (e.g., interoperability engine 502), transaction management engine 106 (e.g., transaction management collection engine 504 of transaction management engine 106) may generate a unique identifier for the message in order to track that message as it moves throughout the interaction system. The unique identifier may be included in the header of the message such that when the next node (e.g., component, device, server, etc.) after transformative processing engine 108 receives the message, that node can report back to transaction management engine 106 that it saw the message. In this manner, transaction management engine 106 may enable end-to-end tracking of messages for the life of the message.

In one example, the messages are requests. The requests may be generated based om user input at one of the components. The requests may be received by transformative processing engine 108 and integrated into the system. In some examples, transaction management engine 106 may be notified that the requests have been received and may therefore be configured to generate message IDs for each request. These message IDs may then be associated with each of the requests. As the requests continue to move throughout the interaction system (e.g., away from transformative processing engine 108), transaction management engine 106 may be track their movement using the message IDs. If one of the requests does not make it to its destination, transaction management engine 106 may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, transaction management engine 106 (e.g., transaction management collection engine 504 of transaction management engine 106) may receive the message and/or message identifier directly from one of components 410-418. For example, one of components 410-416 may be configured to generate the unique message identifier and/or communicate directly with transaction management engine 106. The message also may travel via one or more intermediate nodes on its way to the destination node. In some examples, a node is a component such as components 410-418, which may be running an application. In some examples, the unique identifier and the routing of the message to its destination may be stored in a table that also includes: a geolocation of each node, a network from which the message originated, a type of node, the unique node identifier, and a time associated with the message leaving the origination node. In some examples, transaction management collection engine 504 provides unique message identifiers to other elements of the interaction system to monitor the messages as they move throughout the interaction system. Transaction management collection engine 504 also provides a portion of the unique message identifiers to a transaction management platform (indicated by a circle 528) for further analysis of the message identifiers. Such analysis may include reconciliation of lost messages, latency reporting, audit management and compliance, and other such analyses.

As mentioned previously, interoperability engine 502 is configured to store data in data store 508. A plurality of sub-engines 510-516 of interoperability engine 502 are configured to perform operations relating to storing data in data store 508.

Interoperability engine 502 includes a tagging engine 510 configured to perform semantic tagging and indexing of data. Tagging engine 510 therefore is configured to receive data, read metadata associated with the data, semantically scan the content of the data, and associate one or more tags with the data. Tagging engine 510 may therefore have access to hundreds, thousands, or even more possible tags. These tags may have been input by users, learned, pre-defined, generated by outside third-party mapping sources, and/or gathered from other components and/or data stores of the interaction system. For example, if the data is a chart for an entity, the tagging engine may be configured to read any metadata associated with the chart to determine which tags may be appropriate to associate with the chart. From the metadata, tagging engine 510 may determine that the chart is for a type of entity by reading metadata indicating that an author field is populated with the name of another particular type of entity. Tagging engine 510 may have access to other data to compare the analyzed metadata against (e.g., to identify that the author's name corresponds to Dr. Brown who is an oncologist). Other examples, of metadata that may be included in one or more fields include author, document type, creation time and date, last update time and date, upload time and data, geographic location, unique ID associated with the client or facility where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 510 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 510 and used to decide which tags to associate with the document. In some examples, semantic scanning may involve filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 510 to determine one or more tags to associate with the data. The tags may be chosen, for example, based on values of particular fields in the data, detecting a frequency of one or more words in a document or metadata and/or of a set of related words (e.g., tagging a record with "cancer" upon detecting words such as tumor, metastasize, chemotherapy, radiation, oncology, malignant, stage 3, etc.). In this manner, tagging engine 510 may also index portions of the data within one or more data stores of data store 508. In some examples, such indexing may be based in part on the selected tags.

Interoperability engine 502 also includes a reports engine 512 configured to generate one or more reports or alerts based on data. For example, reports engine 512 may generate reports when certain types of data are received or when data with certain characteristics is received. Reports engine 512 may also generate alerts. The reports and/or alerts generated by reports engine 512 may be outputted in the form of one or more communications to an administrator, an authorized user, or other similar user via a user device. Such communications can include, for example, signals, sirens, electronic notifications, popups, emails, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 502 also includes a rules engine 514 configured to create and manage business rules, condition-response rules, alert/reports rules, data-formatting rules, data-sharing rules, transmission rules, aggregation rules, user authorization rules, and other similar rules. Such rules may be user-defined, fixed, learned by elements of the interaction system, and any combination of the foregoing. Finally, interoperability engine 502 includes an application engine 516 configured to provide service-oriented architecture web services.

Data store 508 includes an electronic record information data store 518 ("record data store 518"), a general data store 520, an operational data store 522, an entity-based data store 524, and a streaming caching storage 526. While data store 508 is illustrated as including a fixed number of data stores and storage elements, it is understood that data store 508 can include any suitable number of data stores and storage elements, including more than illustrated or less than illustrated.

In some examples, a data query script is provided to query a first data store and/or to obtain data for populating a data store. Such script could query a data store described herein (e.g., data store 508) and/or could be used to obtain data to populate a data store described herein (e.g., data store 508). In one instance, the script is configured to be repeatedly executed, so as to repeatedly draw data from a source data store. The retrieved data can then be formatted, filtered, sorted and/or processed and then stored, presented and/or otherwise used. In this manner, the script can be used to produce streaming analytics.

In some instances, the data query script, when executed, identifies each of the data stores of interest. Identifying the data stores of interest involves identifying at least a portion of data from the data stores simultaneously and/or sequentially. For example, the script can identify corresponding data stores (e.g., or components of a single data store or multiple data stores) that pertain to one or more similar variables but that differ in one or more other variables. Once the portion of the data from the data stores is identified, a representation of the identified data can be output to one or more files (e.g., Extensible Markup Language (XML) files) and/or in one or more formats. Such outputs can then be used to access the data within one or more relational database accessible using Structured Query Language (SQL). Queries made using SQL can be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

Within record data store 518 is retained data including electronic record information. In some examples, the information within record data store 518 is organized according to entity identifying information. Thus, record data store 518, in some examples, includes individually identifiable information. But it may also include de-identified information.

Within general data store 520 is retained data. The data may be stored in a relational database format or in any other suitable format. Thus, the data within general data store 520 may be retained in a data structure that includes one or more tables capable of accessing each other. In some examples, general data store 520 includes a subset of the information that is included in operational data store 522.

Within operational data store 522 is retained data in a relational database format. Thus, the data within operational data store 522 may be retained in a data structure that includes one or more data structures (e.g., tables) capable of accessing each other. Operational data store 522 is an example of an operational data warehouse. In operational data store 522 is joined many different types of data. In some examples, the operational data store 522 includes data pertaining to decision making as discussed herein and other data typically used by conventional business concerns.

Within entity-based data store 524 is retained data in a non-relational database format. Thus, the data within entity-based data store 524 may be retained in a structure other than tables. Such structure may be appropriate for large and complex data sets. In some examples, entity-based data store 524 (or any other data store) may be a unified system, which may include: a document-centric, schema-agnostic, structure-aware, clustered, transactional, secure, database server with built-in search and a full suite of application services. An example of such a unified system may be Marklogic. Entity-based data store 524 can support data aggregation, data organization, data indexing, data tagging and mapping to semantic standards, concept matching, concept extraction, machine learning algorithms, concept discovery, concept mining, and transformation of personal record information. In some examples, entity-based data store 524 includes data pertaining to decision making (similar to general data store 520) as discussed that is organized and accessed in a different manner. For example, the data within entity-based data store 524 may be optimized for providing and receiving information over one or more information exchanges. In some examples, entity-based data store 524 includes a subset of the information that is included in operational data store 522.

Finally, in some examples, streaming caching storage 526 is a streaming data cache data store. As discussed previously, certain components of components 410-418 may support streaming data to other components or user devices. Streaming caching storage 526 is a location where streaming data can be cached. For example, assume that component 418 is a piece of equipment operating at Location A and that a user using a computer in Location B desires to view a live of substantially live stream of outputs of the piece of equipment. Component 418 can send a portion of data to streaming caching storage 526 which can retain the portion of the data for a certain period of time (e.g., 1 day). Thus, streaming caching storage 526 is configured to cache data that can be streamed.

Diagram 500 also includes data store integrity engine 506. In some examples, data store integrity engine 506 is configured to ensure integrity of the information within data store 508. For example, data store integrity engine 506 applies one or more rules to decide whether information within all or part of data store 508 should be scrubbed, removed, or adjusted. In this manner, confidence is increased that the information within data store 508 is accurate and current.

Figure 6:
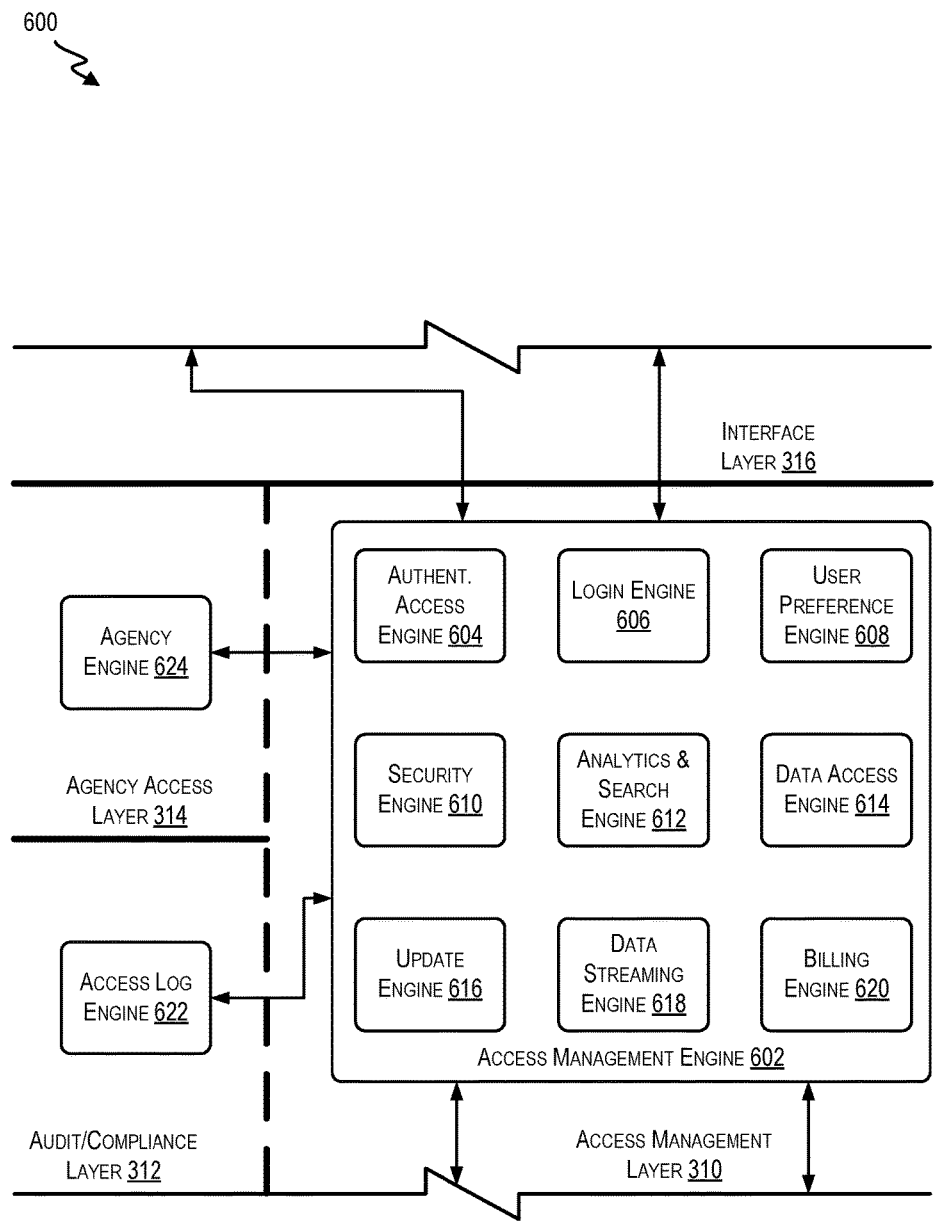
FIG. 6 is an example schematic model illustrating an aspect of the network communication model of FIG. 3 in more detail.

FIG. 6 shows a diagram 600 which depicts a portion of architecture stack 300 according to at least one example. In particular, the diagram 600 includes access management layer 310, audit/compliance layer 312, agency layer 314, and a portion of interface layer 316.

Access management layer 310, as illustrated in the diagram 600, includes an access management engine 602. Access management engine 602 is an example of access management engine 222. Generally, access management engine 602 can be configured to manage access to elements of transformative processing engine 202 by different components, applications, and user devices.

Access management engine 602 within access management layer 310 also provides functionality similar to an operating system. For example, access management engine 602 includes a plurality of engines configured to manage different aspects of interacting with elements of the interaction system. For example, a user who desires to access portions of data retained in data store 508, may do so by interacting with access management engine 602 using one or more applications (not shown). Thus, access management engine 602 includes a variety of engines to enable such interaction. The engines include, for example, an authentication access engine 604, a login engine 606, a user preference engine 608, a security engine 610, an analytics and search engine 612, a data access engine 614, an update engine 616, and a streaming data engine 618. The different engines of access management engine 602 can define routines, protocols, standards, and the like for interacting with elements of the interaction system.

Beginning first with authentication access engine 604, authentication access engine 604 evaluates the rules and conditions under which users may access elements of the interaction system; in particular, the conditions under which users may access data within data store 508. These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 604 authenticates an identity of the user.

Login engine 606 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 604 evaluates the rules to determine which users may access the interaction system, login engine 606 evaluates the particular credentials, profiles, etc. of the users. For example, login engine 606 can confirm that an entered username (e.g., and password), provided biometric data or code or identifier in a scanned tag or badge matches that in an authorized user data structure.

Login engine 606 evaluates one or more user profiles associated with each authenticated user. In some examples, a user profile includes a username, password, and other information associated with the user. For example, a user profile may indicate characteristics about the user.

User preference engine 608 evaluates the rules and conditions under which user are able to store and update one or more user preferences corresponding to access of the interaction system or access to applications associated with the interaction system. These rules and conditions may be user-defined (e.g., by the user or administrator), and may include rules for default preferences. For example, using user preference engine 608, a user may indicate a format in which the user prefers to receive outputted information, display characteristics of a graphical user interface associated with the user, and other similar user preference settings. For example, the user may indicate that certain types of reports and/or alerts are to be sent to the user.

Security engine 610 evaluates the rules and conditions for ensuring the security of access to the elements of the interaction system. In some examples, these rules and conditions are determined by administrators of the interaction system. In some examples, security engine 610 provides a plurality of computer virus protection services. These services can be called up and implemented when accessing the interaction system or accessing applications associated with the interaction system. The rules and conditions may be based on roles, based on profiles, based on domains, and any other suitable security configuration. For example, because the interaction system may include sensitive data, security engine 610 may enforce a domain-based rule that protects certain sensitive information (e.g., identifying information).

Analytics and search engine 612 evaluates the rules and conditions under which users can search for data within the interaction system and access analytics relating to the interaction system. In some examples, these rules and conditions are user-defined or learned over time in accordance with search engine optimization techniques. For example, analytics and search engine 612 is used to search within data store 508 for particular data. Analytics and search engine 612 supports any conventional searching algorithms. For example, search engine 612 can be used to search within various fields and potential field values. In some examples, search engine 612 can provide analytics, such as statistics, graphs, distributions, and/or comparative analysis pertaining to particular entities and/or characteristics. Such information may be selected by a user and presented on a user interface.

Data access engine 614 evaluates the rules and conditions under which users may operation in order to access particular data within data store 508. In some examples, these rules and conditions are user-defined or learned over time. For example, data access engine 614 may indicate the routines, subroutines, or other logic needed for an application to access certain portions of data store 508. For example, while authentication access engine 604 and login engine 606 may manage which users can access parts of the interaction system, data access engine 614 may manage how authenticated users access data within data store 508. To this end, data access engine 614 may enforce and/or evaluate certain rules managing how users access different components of the interaction system. In some examples, data access engine 614 may be used to actually access data within data store 508 (e.g., extract, download, or otherwise access). In some examples, data access engine 614 may define procedures, protocols, and the like for accessing data. The protocols and procedures for accessing data access engine 614 (like the other engines of access management engine 602) may be provided to developers in the form of a software development kit (SDK). SDKs may enable developers write applications that can effectively communicate with elements (e.g., data store 508) of the interaction system. In particular, applications that can access a portion of the data stored within active unified data layer 308.

Update engine 616 evaluates the rules and conditions for providing updates to other engines within access management engine 602, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed, a report may be sent indicating that the update was successful or unsuccessful, or the like.

Streaming data engine 618 defines the rules and conditions for enabling streaming of data between components and user devices of the interaction system. For example, streaming data engine 618 may enable component 414 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 618 may identify a streaming destination and a streaming origin. Next, streaming data engine 618 may pair the two and enable streaming. This may include allocated bandwidth within one or more network devices associated with the interaction system. Streaming data engine 618 may also adjust the quality of the streaming data based on the availability of bandwidth. In some examples, streaming data engine 618 may receive incoming streams (and continuously present the stream or monitor for particular data (e.g., exceeding a threshold, exhibiting an above-threshold change, having a particular value)).

Within audit/compliance layer 312 is located an access log engine 622. Access log engine 622 evaluates the rules and conditions for logging access to the interaction system by users, applications, devices, and the like. Logging access includes, in some examples, logging data conventionally collected by access log engines running in similar environments. Access log engine 622 can use this data to generate and transmit reports, for example, to stakeholders of the interaction system such that they can make informed decisions regarding that is accessing the interaction system and for what purposes.

Within agency layer 314 is located an agency engine 624. Agency engine 624 evaluates the rules and conditions under which agencies can access the interaction system. For example, agencies that may use agency engine 624 include agencies to which the interaction system provides compliance, tracking, or other reporting information. For example, agency engine 624 may be used to track one or more performance indicators identified by a government agency and/or to provide report instances of defined types of events. Thus, in some examples, a government agency uses agency engine 624 to collect data pertaining to compliance of the interaction system with one or more statutes or regulations. In some examples, a university is an agency that uses agency engine 624 to collect data pertaining to one or more studies. In some examples, agency engine 624 can identify one or more entities (e.g., governmental agencies) that are to receive reports pertaining to operations or events and what types of data are to be reported to those entities. Agency engine 624 can then collect the pertinent data, potentially format and/or analyze the data, and facilitate transmission of (e.g., raw, formatted and/or analysis of) the data to the appropriate agency.

Figure 7:
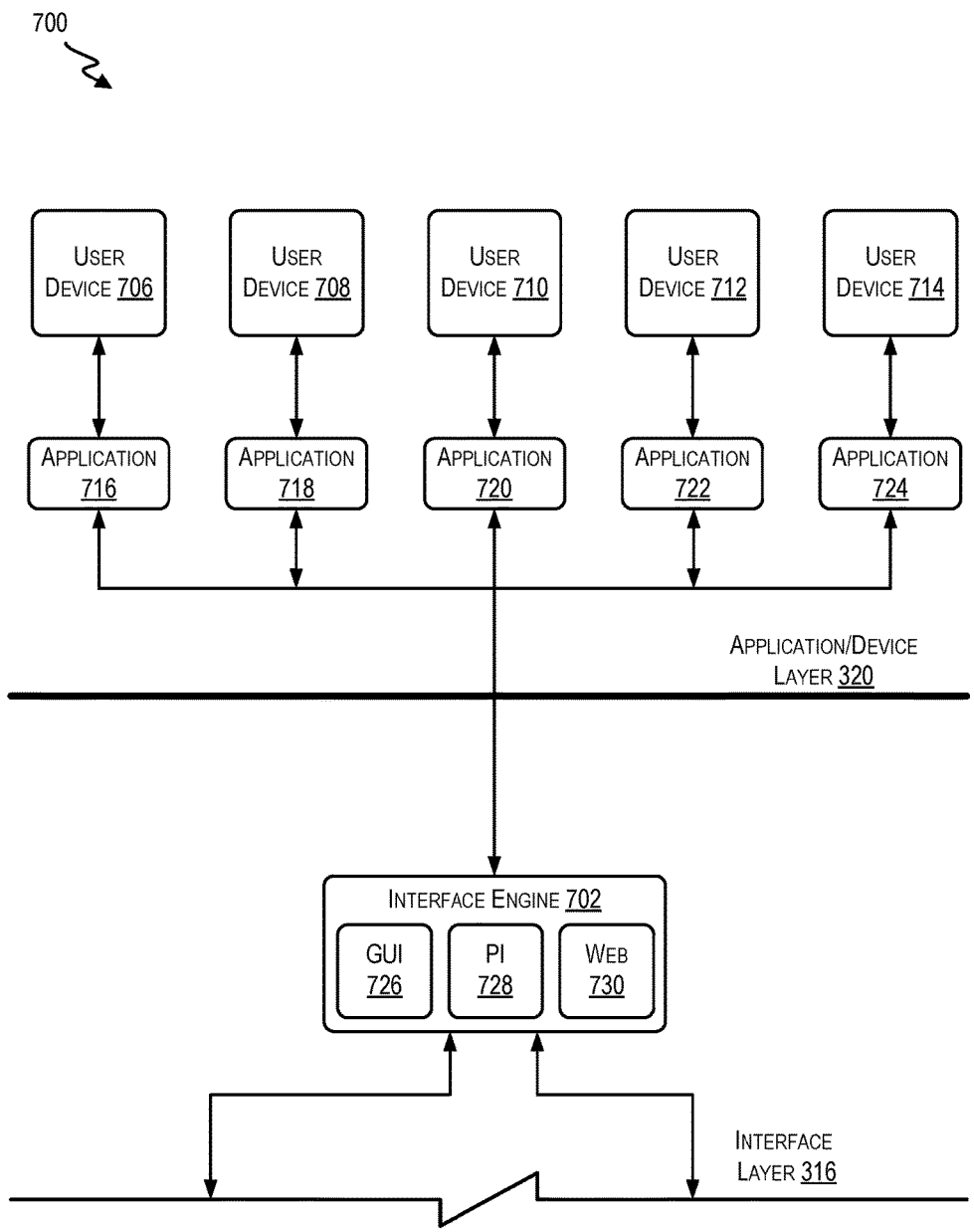
FIG. 7 is an example schematic model illustrating an aspect of the network communication model of FIG. 3 in more detail.

FIG. 7 shows a diagram 700 which depicts a portion of architecture stack 300 according to at least one example. In particular, diagram 700 includes interface layer 316, and application/device layer 320. Within interface layer 316 is located interface engine 702 (e.g., interface engine 224). Interface engine 702 is configured to generate one or more interfaces (e.g., graphical user interface 726, programmatic interface 728, and/or web interface 730) to enable data to flow to user devices 710, 712, and 714 via respective applications 720, 722, and 724. In some examples, the interfaces of interface engine 702 are embodied in hardware, software, or some combination of both. Within interface layer 316 communications and inputs directed to interacting with elements of access management layer 310 may be embodied.

Graphical user interface 726 is any suitable graphical user interface configured to interact with elements of the interaction system. Programmatic interface 728 includes an application programming interface, a programmatic user interface, and other similar interfaces for defining core functions for accessing elements of the interaction system. For example, programmatic interface 728 may specify software components in terms of their operations. Web interface 730 is any suitable web interface configured to interact with elements of the interaction system. Any of the interfaces described herein may be configured to receive user input, present dynamic presentations that depend on user input, and otherwise respond to user input. In some examples, such input may be provided via one or more input devices (e.g., a keyboard, touchscreen, joystick, mouse, microphone, devices capable of capturing inputs, and the like) operated by one or more users of user devices 706-714. Output may be provided via one or more output devices (e.g., a display or speaker).

Interface engine 702 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 320, applications 716-724 which communicate with other elements of architecture stack 300 using the interfaces generated by interface engine 702 are defined. This includes detailing how applications 716-724 are to interact with the interfaces generated by interface engine 702 for accessing data. For example, interacting may include accepting inputs at user devices 706-714 to access data and, in response, providing the data, prompts, or other types of interaction with one or more users of the user devices 706-714. Thus, applications 716-724 may be related to one or more of the interfaces generated by interface engine 702. For example, application 720 may be interact with a graphical user interface (whether generated by interface engine 702 or otherwise) to interact with other elements of the interaction system. Interacting may include receiving inputs at the graphical user interface via application 720, providing output data to the graphical user interface application 720, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 706-714 running one of the other applications 716-724.

Turning now to the details of applications 720, 722, and 724. In some examples, applications 720, 722, and 724 include a variety of different applications that can be designed for particular users and/or uses. In one example, application 720 includes dashboards, widgets, windows, icons, and the like that are customized for a particular entity. In some examples, application 720 may present different data depending on a specialty associated with the entity and protected information associated with the entity. In this manner, application 720 adapts and automatically adjusts depending on the context in which the entity is using the application. In some examples, the data indicates performance statistics for the entity, metrics relating to where the entity falls along a distribution of other similar entities, outlier instances, trends in events or actions, and the like. Application 720 may be configured to receive input, adjust presentations, present unprompted alerts, adjust display of content, move more relevant content to the foreground, move less relevant content to the background, populate forms for the entity.

In another example, application 722 may be specific for nurses or types of nurses. In this example, application 722 may include dashboards, widgets, windows, icons, and the like that are customized to individual nurses. Similar to the example discussed above pertaining to the user, in some examples, application 724 may present different data depending on a position of the nurse. In this manner, application 722 adapts and automatically adjusts depending on the context in which the nurse is using the application. For example, the nurse may receive data, such as test results.

In some examples, application 724 may be a multi-role application for administrators and is used to manage entities constitute the population of the entities or organizations within the interaction system. Similar to the other examples discussed, in some examples, application 724 may present different data depending on a role of the user who is using application 724. In this manner, application 724 adapts and automatically adjusts depending on characteristics of the user who is using application 724. In this manner, application 724 can provide different data depending on the role of the user. For example, whether data presented includes identifiable or de-identified information may depend on a position of the user.

In some examples, application 724 may be a business intelligence application. In this example, application 724 is used to display business information generated by components of the interaction system. This business information can be used for operations, planning, and forecasting. Such business information may include data because such data may impact operations, planning, forecasting, and the like. Accordingly, application 724 may present de-identified information in the form of one or more metrics, indicators, or the like as they pertain to business intelligence.

Applications 716 and 718 shown in connection with interface engine 702 are applications developed by third-parties. In some examples, such applications include any suitable application that benefits from accessing data. The interaction system may include data pertaining to hundreds of thousands of entities. Having data pertaining to so many entities presents security concerns. For example, much of the data may be identifying data. Accordingly, data that may be accessed by applications 716 and 718 may be limited. In some examples, an entity of the interaction system may use one of applications 716, 718 to access his or her own data. In this example, the identity of the entity may be verified in accordance with techniques described herein.

User devices 706-714 are any suitable user devices capable of running applications 716-724. User devices 706-714 are examples of the user device 228. In some examples, the user devices include: mobile phones, tablet computers, laptop computers, wearable mobile devices, desktop computers, set-top boxes, pagers, and other similar user devices. In some examples, at least some of user devices 706-714 are the same devices as at least some of the one or more components 410-418. In some examples, user devices 706-714 may include complementary layers to application/device layer 320 and/or receiving layer 302. For example, user devices 706-714 may include a transmission layer, a generation layer, and/or a receiving layer to communicate data at application/device layer 320 and at receiving layer 302.

Figure 8:
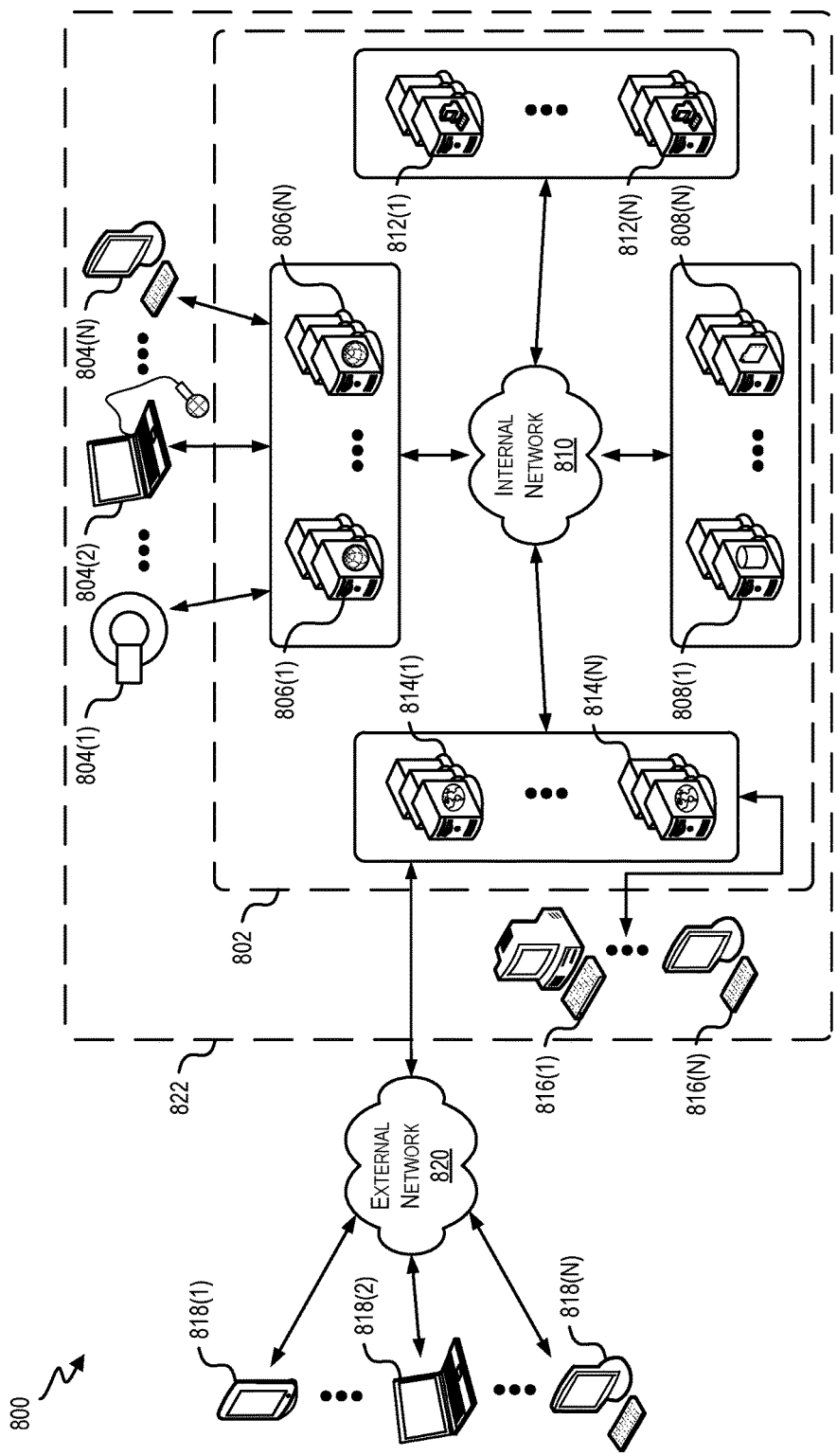
FIG. 8 is an example schematic architecture illustrating a network in which techniques relating to managing message flow and message customization as described herein may be implemented, according to at least one example.

Turning now to FIG. 8, an interaction system 800 is shown according to at least one example. Interaction system 800 includes an internal organization 822 including a transformative processing engine 802. The transformative processing engine 802 is an example of transformative processing engine 202 previously discussed. Interaction system 800 is illustrated as an example configuration for implementing the techniques described herein. In particular, a configuration of elements as illustrated in FIG. 8, at least in some examples, communicates according to the layers of architecture stack 300. For example, internal organization 822 includes generation components 804(1), 804(2), and 804(N) which provide data to aggregation servers 806(1)-806(N).

Generation components 804(1), 804(2), and 804(N) operate in accordance with receiving layer 302. In some examples, generation component 804(1) is a piece of equipment, generation component 804(2) is computer with a data collection device, a type of lab system, and generation component 804(N) is a terminal. Aggregation servers 806(1)-806(N) operate in accordance with aggregation layer 304. Aggregation servers 806(1)-806(N) share data with data storage servers 808(1)-808(N) via one or more internal network(s) 810. In some examples, internal network 810 is any suitable network capable of handling transmission of data. For example, internal network 810 may be any suitable combination of wired or wireless networks. In some examples, internal network 810 may include one or more secure networks. Data storage servers 808(1)-808(N) are configured to store data in accordance with active unified data layer 308. Data storage servers 808(1)-808(N) include database servers, file storage servers, and other similar data storage servers.

Access management servers 812(1)-812(N) manage access to the data retained in the data storage servers 808(1)-808(N). Access management servers 812(1)-812(N) communicate with the other elements of interaction system 800 via internal network 810 and in accordance with access management layer 310.

Interface servers 814(1)-814(N) provide one or more interfaces applications to interact with the other elements of interaction system 800. Interface servers 814(1)-814(N) provide the one or more interfaces and communicate with the other elements of interaction system 800 via internal network 810 and in accordance with interface layer 316. The interfaces generated by the interface servers 814(1)-814(N) can be used by internal user devices 816(1)-816(N) and external user devices 818(1), 818(2), and 818(N) to interact with elements of interaction system 800.

Internal user devices 816(1)-816(N) are examples of user devices 706-714. In some examples, internal user devices 816(1)-816(N) run applications via the interfaces generated by interface servers 814(1)-814(N). As an additional example, external user devices 818(1), 818(2), and 818(N) can run applications developed by third parties that access the other elements of interaction system 800 via the interfaces generated by interface servers 814(1)-814(N).

External user devices 818(1), 818(2), and 818(N) access the interfaces via external network 820. In some examples, external network 820 is an unsecured network such as the Internet. External user devices 818(1), 818(2), and 818(N) are examples of user devices 706-714. External user device 818(1) is a mobile device. In some examples, the mobile device may be configured to run an application to access interaction system 800. Similarly, the other external user devices 818(2)-818(N) run applications that enable them to access interaction system 800. While interaction system 800 is shown as implemented using discrete servers, it is understood that it may be implemented using virtual computing resources and/or in a web-based environment.

The environments, systems, networks, models, and the like of FIGS. 1-8 may be used to implement the techniques described herein. For example, in one example, an information exchange engine in connection with an enterprise service bus is provided that routes inbound messages, routes outbound messages, modifies messages to create customized messages, and generates customized messages. The information exchange engine operates in a service layer of an interaction system such as a provider network. The information exchange engine provides a service-based approach to message generation, customization, and routing that improves over existing methods of direct messaging (e.g., node to node). This is because node to node message may require hard coded rules that must be updated each time changes are made to network nodes. Using the service-based approach, once an address or other identifier has been updated or added to a list of addresses, messages may be received and provided to the entities represented by the addresses.

Use of the service-based approach provides enhanced enterprise level security by maintaining a centralized database of authorized entities that send and/or receive data with respect to the provider network. If an anomaly is detected that relates to one of the authorized entities, the information exchange engine can execute a response protocol. An example response protocol may include terminating all connections between the authorized entity and the enterprise. In some examples, depending on the type of authorized entity, the number of connections may be hundreds, thousands, or even more. This added level of security limits the extent to which confidential user information can be disclosed.

Use of the service-based approach enables customization of messages by modifying the messages for recipients based on a set of parameters and a set of customization rules (e.g., messaging rules). For example, a continuity of care document (CCD) is typically generated in accordance with an existing protocol. A message included in the CCD can be sent when a dependent user (e.g., a patient) is transferred from a first facility to a second facility. Using the techniques described herein, the CCD can be modified to create a customized or tailored CCD (e.g., customized specialized document) based on data about the dependent user, data about the transferring professional user such as a professional, and data about the receiving professional user. For example, certain data can be emphasized depending on a condition of the dependent user or a specialty associated with the receiving professional user. An importance or relevance hierarchy can be used to determine what information should be emphasized and what information requires less attention. For example, summaries of encounters at the first facility can be generated that focus on information that will be relevant to the receiving professional user given her specialty. A third professional user such as family professional user of the dependent user may also receive a different version of the message that is modified for the third professional user.

In some examples, use of the service-based approach enables generation of entirely new customized messages based on the set of parameters and the set of customization rules. The parameters and rules used for modification may also be different from those used for customization. Like the modification of messages, the generation of messages can be customized to multiple professional users and the dependent user.

Use of the service-based approach to generate customized messages reduces the signal noise with which professional users are often bombarded. In particular, the customized messages are generated and/or modified in a manner that attempts to include the most relevant information and disregard other possibly irrelevant information. For example, a typical CCD can be a very large file including data from multiple encounters, many of which may be irrelevant to some receiving professional users given their roles in caring for the dependent user. In this case, the professional users may become lost in the larger file, miss important details, or otherwise be required to spend a protracted time studying the document. Using the service-based approach described herein, the typical CCD can be trimmed down, added to, and/or otherwise modified to improve the likelihood that the receiving professional users will have what they require to efficiently and correctly respond to the current conditions of the dependent user.

Use of the service-based approach to generate customized messages also reduces the likelihood of accidental disclosure of confidential or other private information of the dependent user. For example, because certain jurisdictions may limit the extent to which behavioral data can be disclosed, messages that would typically include such data by default can be modified or otherwise generated in a manner that removes or alters the behavioral data. In a particular example, results of a behavioral examination may be removed from a CCD prior to the CCD being sent to a payer or some professional user responsible for responding to other conditions of the dependent user.

Figure 9:
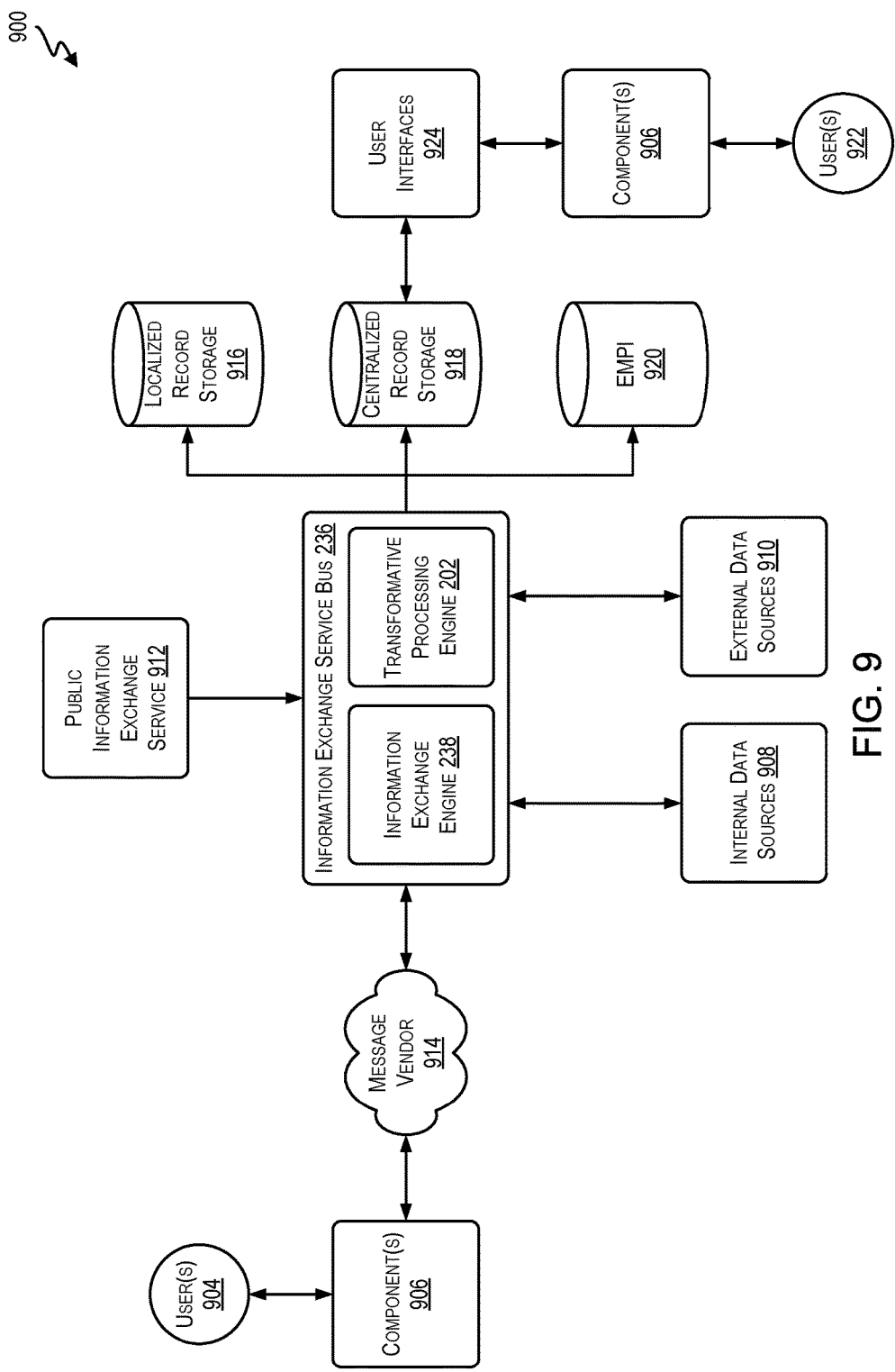
FIG. 9 is an example block diagram illustrating an environment in which techniques relating to managing message flow and message customization as described herein may be implemented, according to at least one example.

Turning now to FIG. 9, an interaction system 900 is shown according to at least one example. The interaction system 900 may be implemented using at least some of the elements of the interaction system 800. The interaction system 900 includes the transformative processing engine 202 configured as described herein and an information exchange service bus 236, which is configured to implement the techniques described herein. For example, the information exchange service bus 236, including the components implemented thereby, provide for efficient transfer of messages including particular content. This can include evaluating requests in accordance with a variety of configurable conditions to determine destination(s) for messages, changes to content of messages, etc. This may be achieved in a manner that seeks to avoid point-to-point connections with hard-coded rules. And instead uses the interaction system 900 that includes rules engines, etc. and is extendible to varieties of different scenarios (e.g., change of responsibility, transfer, release, inbound records, outbound records, etc.), which may take place between a variety of different entities/users (e.g., professional user to professional user, business entity to another business entity, dependent user to professional user, professional user to payer business entity, dependent user to dependent user, professional user to dependent user, any other suitable combinations of sharing entities/users).

Using the interaction system 900 can protect confidential personal information by ensuring that recipients are sent only the information to which they are entitled. Use of the information exchange service bus 236 within the interaction system 900 may also allow professional users and dependent users to appropriately access and securely share a dependent user's vital information electronically. In some examples, the information exchange service bus 236 may be built using a BizTalk framework, or other suitable integration engine. Thus, the information exchange service bus 236 may include the transformative processing engine 202 described herein. The information exchange service bus 236 functions as a gateway for inbound messages, a gateway for outbound messages, a modifier for message customization, a router for message routing, a storage location for storing message content, and a quality control device for ensuring that records stored in association with the information exchange service bus 236 are maintained at a certain level of quality and that messages that could affect the user records are also held to a certain level of quality.

In some examples, inbound messages may originate and be transferred via many different entities. Inbound messages may be those messages that are directed to an entity that operates the interaction system 900 or is otherwise closely associated with the information exchange service bus 236. By comparison, outbound messages may be those messages that are directed away from the information exchange service bus 236 (e.g., messages that leave the information exchange service bus 236 to other entities). For example, users 904 can utilize components 906 to generate data that can be transferred using electronic messages. The users 904 may be professional users associated with an organization that hosts the interaction system 900 or may not be associated with the organization. In some examples, the users 904 are dependent users. Inbound messages may originate with contributors (e.g., source entities, source devices, data sources, etc.). Outbound messages may be directed to subscribers (e.g., destination entities, destination devices, storage locations, etc.). The information exchange service bus 236 can determine what to do with messages (both inbound and outbound) based on message criteria, which can be used to establish subscriptions to the information exchange service bus 236. For example, a subscriber may submit a set of message criteria to the information exchange service bus 236 that functions as a request to receive messages that correspond to the message criteria. In some examples, being an authorized subscriber is a prerequisite to submitting message criteria. For example, the information exchange service bus 236 can be configured to manage the authorization process and to manage a list of authorized entities. In this manner, the information exchange service bus 236 can protect against disclosure of confidential personal information and direct messages to the appropriate entities. The message criteria may include dependent user identifiers, facility identifiers, professional user identifiers, conditions of transfer, and any other suitable criterion.

Inbound messages can also originate from one or more internal data sources 908 (e.g., internal contributors). The internal data sources 908 are data sources that are internal to the interaction system 900 and/or to a provider organization that hosts at least a portion of the interaction system 900. In some examples, such internal data sources 908 provide messages to the information exchange service bus 236 according to the C-CDA standard or any other suitable standard for message transfer. In this manner, the internal data sources 908 may each include any appropriate computing device configured to share messages with the information exchange service bus 236.

Inbound messages can also originate from one or more external data sources 910 (e.g., external contributors). The external data sources 910 are data sources that are external to the interaction system 900 and/or to the provider organization that hosts at least a portion of the interaction system 900. In some examples, such external data sources 910 may provide messages to the information exchange service bus 236 according to C-CDA standard, according to one or more document sharing standards (e.g., Cross-Enterprise Document Sharing (XDS), Cross-Enterprise Document Reliable Interchange (XDR), XDS.b, and any other suitable standard). In this manner, the external data sources 910 may each include any appropriate computing device configured to share messages with the information exchange service bus 236.

Inbound messages can also originate from a public information exchange service 912. The public information exchange service 912 is a collection of hardware and software that functions as a location where user record data may be stored and shared by various users. In some examples, the public information exchange service 912 is operated and maintained by a state, and professional users within the state may subscribe to the public information exchange service 912. In some examples, the information exchange service bus 236 may be considered a private information exchange service.

The users 904 may come from the same group of users and may be similar to the users that operate the components 410-418 and/or the users that operate the user devices 706-714. Accordingly, the users 904 interact with components 906 to generate data. The components 906 are examples of the components 410-418 discussed herein. In some examples, the users 904 interact with the components 906 at each of the public information exchange service 912, the internal data sources 908, and the external data sources 910 to generate messages.

As described herein, the components 906 may be disposed at various locations which correspond to at least some of the internal data sources 908 and the external data sources 910. In some examples, the components 906 are located at various physical locations devoted to responding to current conditions of dependent users. These physical locations are locations where professional users work and provide care for the dependent users. In some examples, the sources may be associated with the provider organization that hosts the interaction system 900 or not. The components 906 provide inbound messages using a form of Direct Messaging Protocol to the information exchange service bus 236 via a message vendor 914. The message vendor 914 may provide secure messaging between existing systems. In some examples, the message vendor 914 is an example of a HISP. In some examples, the components 906 provide inbound messages using XDR or XDM for Direct Messaging to the information exchange service bus 236 without first going through the message vendor 914. In some examples, the message vendor 914 may have Agreements HIPAA Covered Entities with whom it communicates. In this manner, the message vendor 914 may provide a secure means for communicating with the information exchange service bus 236 that is protective of confidential personal information. In some examples, the interaction system 900 is built and implemented in a manner that is also protective of confidential personal information.

Inbound messages may be processed by the information exchange service bus 236 as described herein and routed to one or more destination entities. In some examples, the destination entity for an inbound message is within a storage area of the information exchange service bus 236. In other examples, the inbound messages may be provided to one or more entities that store, process, or otherwise consume at least a portion of the information included in the inbound messages. Examples of entities include an localized record storage 916, a centralized record storage 918, and an EMI 920.

The localized record storage 916 can be a record documentation system that includes dependent user record data. In some examples, a particular localized record storage 916 is associated with a physical location or a network of physical locations at which professional users are employed. These physical locations may be external to the interaction system 900. In some examples, a particular localized record storage 916 may be shared among one or more entities.

The centralized record storage 918 may include record documentation system that includes record data that is associated with dependent users for whom the provider organization that hosts the interaction system 900 is responsible. For example, an inbound message associated with a new dependent user and including a user record may be routed to, stored, and otherwise consumed by the centralized record storage 918. If this new dependent user is also going to be treated by a professional user not associated with the interaction system 900, the inbound message may also be routed to the localized record storage 916 so that the professional user can access the user record.

The EMPI 920 can be a database that is used across an organization to maintain consistent, accurate and current demographic and essential data on the dependent users seen and managed within its various departments. The dependent user can be assigned a unique identifier that is used to refer to this dependent user across the enterprise. The EMPI 920 may be accessed and updated as inbound and outbound messages are processed by the information exchange service bus 236. In some examples, the EMPI 920 may include user data such as name, gender, date of birth, race and ethnicity, social security number, current address and contact information, payment information, current conditions, most recent date of admission and discharge (if applicable), and any other suitable information.

In some examples, an inbound message may originate with a first physical location that is considered one of the external data sources 910 or an entity at which one of the components 906 is located. The inbound message may relate to a change in responsibility for a dependent user of the first physical location and may be sent with identifying information included therein to the message vendor 914. In some examples, this inbound message is a CCD message. In any event, the message vendor 914 can forward the message to the information exchange service bus 236. The information exchange service bus 236 may inspect a source entity associated with the inbound message (e.g., the first physical location) or the component at the first physical location and determine whether the source entity is a trusted entity. If trusted and the inbound message corresponds to a valid use case established by rules within the information exchange service bus 236, the information exchange service bus 236 determines a destination entity for the inbound message. Once the destination entity is determined, the information exchange service bus 236 routes the inbound message to a message queue associated with the destination entity (e.g., one of the record storages 916 or 918, one of the internal data sources 908, one of the external data sources 910, or the public information exchange service 912). If appropriate, the inbound message may also be routed stored in any of the record storages 916 and 918 in addition to being routed to a different destination entity. A record corresponding to the routing of the inbound message can be developed that includes information about the routing of the inbound message. This record can be used for reporting purposes and saved by the information exchange service bus 236.

In some examples, data associated with inbound messages or other record data may be accessed by one or more users 922 using one or more user interfaces 924. The user interfaces 924 can be generated by the information exchange service bus 236 and accessed via a network (e.g., an intranet, the Internet, or any other suitable private or public network). In some examples, the user interfaces 924 are generated by components similar in form and function to at least some of the components 906 in order to access the centralized record storage 918. In some examples, the user interfaces 924 receive data from the information exchange service bus 236 via the centralized record storage 918. For example, the information exchange service bus 236 can push data to the user interfaces 924 as appropriate. Using the techniques described herein, the user interfaces 924 can function as viewers of the data pushed and/or otherwise provided by the information exchange service bus 236. The user interfaces 924 can include portals, viewers, record management modules, practice management modules, and any other suitable device configured to consume record data.

In some examples, outbound messages may originate within the information exchange service bus 236 or within any of the localized record storage 916, the centralized record storage 918, or in response to one of the users 922 interacting within one of the user interfaces 924. For example, an admit discharge transfer (ADT) trigger or a trials registration and results (CTR&R) trigger may be detected within the localized record storage 916 and provided to the information exchange service bus 236. In another example, a CCDA transfer of care (TOC) document may be generated by the centralized record storage 918 and provided to the information exchange service bus 236 in response to one of the users 922 interacting via one of the interfaces 924.

Once the information exchange service bus 236 receives at least one of these outbound messages, the information exchange service bus 236 may evaluate the message to determine whether the requested information is present and whether unnecessary information should be removed from the message. For example, the information exchange service bus 236 can access the centralized record storage 918 to determine whether a related record should be provided with the TOC document.

In some examples, the information exchange service bus 236 may route the particular outbound message to any suitable entity based on information derivable from the message. In some examples, the outbound message may indicate a destination entity. In other examples, the destination entity may be determined based on a set of routing rules selected based on a message type associated with the message. In some examples, the destination entity may be derived based on features of the message. In some examples, the information exchange service bus 236 provides the outbound message to the message vendor 914 using any suitable protocol such as direct message CCDA, which may be filtered, altered, or otherwise based on a destination rule set. The message vendor 914 may then function to effect final delivery of the outbound message to the destination entity.

In some examples, the information exchange service bus 236 can be used to route to which destination entities records should be provided. Thus, rather than let the sending entity to determine which destination entity to send the record to, the information exchange service bus 236 can automatically and/or by interacting with a transfer center determine where to send the records. The transfer center can include a collection of human users that are trained to participate in the routing of records. For example, a message including a dependent user record can be received at a transfer center. The transfer center can forward the message to the information exchange service bus 236 and the information exchange service bus 236 can select to which destination entities the message including the dependent user record should go.

In some examples, change in responsibility can be managed by the information exchange service bus 236. For example, a change in responsibility for a dependent user at a first entity that is operated by a third party may be transferred to a second entity that is operated by the provider organization associated with the interaction system 900. A message that includes the change in responsibility document (e.g., a CCD) can be generated and transferred to the information exchange service bus 236. However, for certain reasons or otherwise, the operator of the information exchange service bus 236 may not want to accept the information associated with the change in responsibility until the dependent user actually arrives at the second entity. The information exchange service bus 236 can function to place the message in a staging area until the dependent user arrives at the second entity. This would allow a professional user to authenticate that the operator is allowed to store the dependent record as a formal record.

In some examples, referrals may be managed by the information exchange service bus 236. For example, the information exchange service bus 236 can receive a referral from an entity that is operated by a third party. The referral can be routed to the information exchange service bus 236 which can then decide to whom the referral should be forwarded. For example, it may be more appropriate for the referral to be sent to a particular professional user, instead of to an inbox at the entity.

In some examples, outcome or progress messages can be managed by the information exchange service bus 236. For example, after a first entity has transferred a dependent user to a second entity associated with the information exchange service bus 236, the information exchange service bus 236 can be used to track the progress of the dependent user at the second entity and provide outcome and/or progress messages. For example, if a dependent user is transferred to the second entity for a certain reason, upon release of the dependent user by the second entity, an outcome message can be generated and provided to the first entity. The level of outcome and/or progress can be configurable based on the relationship between the two entities or based on other factors. Thus, the amount of information provided as part of the outcome messages and progress messages can be variable. In addition, like with the other examples described herein, the manner in which the outcome messages and progress messages are transferred by the information exchange service bus 236 can be configurable (e.g., direct messaging, secure email, short message service (SMS), web links, an inbox in a portal, etc.).

In some examples, if an entity has not been authenticated by the information exchange service bus 236, the entity can be placed on a blacklist. So long as the entity is on the blacklist, messages from the entity will not be consumed by the information exchange service bus 236. This helps protect against receiving potentially nefarious messages from entities. The information exchange service bus 236 may also maintain a whitelist. Entities that are not on the whitelist can be placed into an evaluation queue. The information exchange service bus 236 can then monitor the interactions between those entities and the information exchange service bus 236. This can include evaluating messages and user records provided by the entities to the information exchange service bus 236 in terms of quality and content. This can ensure that data that is received by the information exchange service bus 236 complies with a set of quality standards. Once the information exchange service bus 236 has verified that the data received from the entities meets the quality standards, the information exchange service bus 236 can authenticate the entities to ensure that they are trusted or otherwise authorized sources. Authentication, as described herein, can include ensuring that the trusted entities are willing to comply with a set of formal rules relating to privacy and protection of confidential record information.

Figure 10:
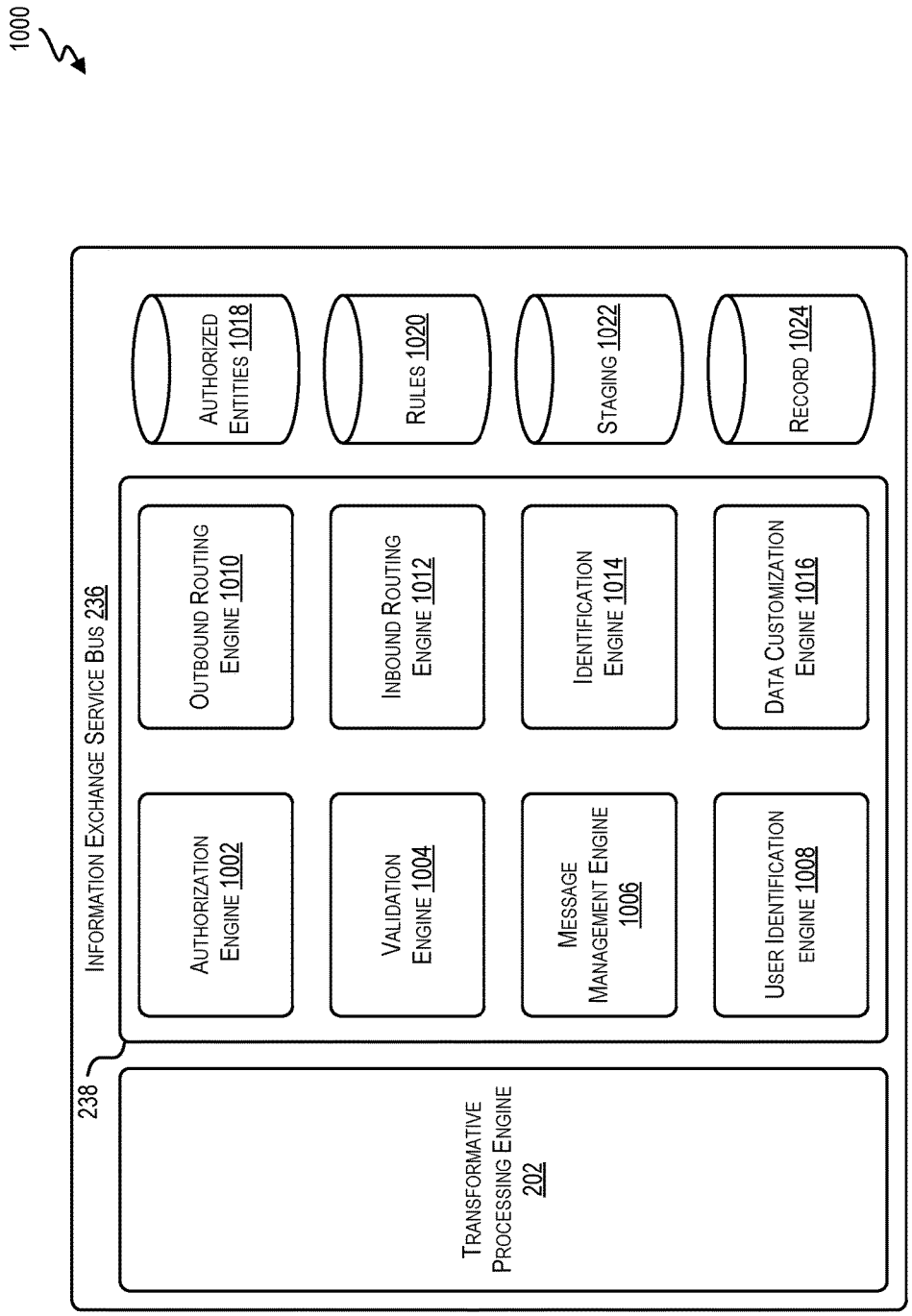
FIG. 10 is an example block diagram illustrating an environment in which techniques relating to managing message flow and message customization as described herein may be implemented, according to at least one example.

FIG. 10 illustrates the information exchange service bus 236 including the transformative processing engine 202 and the information exchange engine 238. The information exchange engine 238 can represent a single component, multiple components located at a central location, or multiple components distributed throughout a provider network. In general, the information exchange engine 238 may include any appropriate combination of hardware and/or software suitable to provide the described functionality. In some examples, at least part of the functionality described with reference to the information exchange engine 238 may be achieved as portions of the information exchange engine 238 are loaded and executed on one or more processors described herein. The information exchange engine 238 may be configured to manage one or more sub-modules, engines, components, and/or services directed to examples disclosed herein. In some examples, the information exchange engine 238 can include an authorization engine 1002, a validation engine 1004, a message management engine 1006, a user identification engine 1008, an outbound routing engine 1010, an inbound routing engine 1012, an identification engine 1014, and a customization engine 1016. While these engines are illustrated in FIG. 10 and will be described as performing discrete tasks with reference to the flow charts, it is understood that FIG. 10 illustrates example configurations and other configurations performing other tasks and/or similar tasks as those described herein may be implemented according to the techniques described herein. Other modules, components, or engines may perform the same tasks as the information exchange engine 238 or other tasks. The information exchange service bus 236 may also include an authorized entities database 1018, a rules database 1020, a staging database 1022, and a record database 1024.

The authorization engine 1002 is configured to manage authorization of entities (e.g., source entities or destination entities) to provide messages to the information exchange service bus 236 and/or other destination entities. In some examples, entities can include computing devices associated with suitable physical location as described herein. The authorization engine 1002 is also configured to access the EMPI 920 to match dependent users with messages.

As part of managing authorization of entities, the authorization engine 1002 can receive authorization requests from entities desiring to share information with the information exchange service bus 236 or receive information from the information exchange service bus 236. A particular authorization request for a particular entity may uniquely identify the entity (e.g., via a unique identifier) and may indicate whether the entity has agreed to certain conditions for accessing the information exchange service bus 236. Such conditions can include agreeing to comply with sets of rules and/or regulations regarding protection of user information, which may transcend the information exchange service bus 236 (e.g., HIPAA) or may be specific to the information exchange service bus 236 (e.g., rules established in addition to HIPAA or otherwise that describe conditions for access to the information exchange service bus 236). The process of agreeing to comply with the sets of rules and/or regulations may take place using formal documents signed by agents of the entities and agents of the provider organization. Acceptance of the formal documents may be preconditions to becoming an "authorized entity" for purposes of accessing the information exchange service bus 236. In some examples, authorization from a dependent user whose user record will be shared is a precondition for the entities to share the dependent user's record with the information exchange service bus 236.

Authorized entities can be added to a list of authorized entities retained within the authorized entities database 1018. The authorization engine 1002 may therefore be configured to manage the list of authorized entities in the authorized entities database 1018. The authorized entities database 1018, for a particular authorized entity, can identify the particular authorized entity by its respective unique identifier, indicate privileges and restrictions corresponding to the particular authorized entity, include information relating to agreements to comply with the rules and/or regulations, and include any other suitable information relating to the conditions under which the particular authorized entity has been granted access to the information exchange service bus 236. The authorized entities database 1018 can also be used to manage subscriptions of the authorized entities, including permissions, for each entity, which can be at any level of granularity (e.g., network, practice, user interface, user, etc.). In some examples, users can access the authorized entities database 1018 to manage their subscriptions. The authorized entities database 1018 can be stored in a centralized location to enable quick and efficient access. In some examples, the authorized entities database 1018 in connection with the routing engines 1010, 1012 can be used to immediately turn off connections to a particular entity and/or turn on connections to the particular entity The validation engine 1004 is configured to validate messages. This can include determining whether destination entities are capable of processing messages. This can also include validating based on information collected and/or managed by the authorization engine 1002. For example, vendors (e.g., source entities) can provide messages at different levels of quality. In order to maintain a high standard of quality in records that are managed by the information exchange service bus 236, the validation engine 1004 can validate inbound messages (e.g., TCDs) and can filter poor data and/or remediate poor data to meet the high standards of quality. This can include structural validation and, in some cases, content validation. In other examples, the validation engine 1004 can determine whether a source entity is a trusted source entity (e.g., by accessing the authorized entities database 1018). If the source entity is not a trusted source entity, the validation engine 1004 can inform the authorization engine 1002 to perform an authorization technique with the source entity.

The message management engine 1006 is configured to initiate message listeners configured to detect messages. The listeners may be specific to message type, destination entity, and any other suitable characteristic. Examples of listeners can include: ITI-41, HL7 v.2, HL7 v.3, C-CDA, NEMSIS, FHIR, XDs.b, XDR, or other suitable protocols.

The listeners can be used to detect messages based on information included with the messages. In some examples, the message management engine 1006 can identify types of messages. For example, whether the messages correspond to any of the sharing scenarios described herein. The message management engine 1006 can also identify features of the message. Once the messages and features have been detected, the message management engine 1006 can parse the messages to determine whether the features of the message comply with one or more standards for messages of the types to which the messages belong. If so, the messages may continue to be processed by the information exchange engine 238. If not, the message management engine 1006 can perform one or more operations on the messages to adjust aspects of the messages to comply with the standards. In some examples, the message management engine 1006 requests that the source entities provide missing information or provide a clarification as to other information included in the messages.

The user identification engine 1008 is configured to identify a dependent user associated with a message. In some examples, the dependent user's record can be transferred via the message. In some examples, the dependent user (using a user device) is a source entity or destination entity of the message. The user identification engine 1008 can access the EMPI 920 in order to identify the dependent user. For example, the message may include only a portion of user identifying information of the dependent user (e.g., a user number). Thus, in order to uniquely identify the dependent user, the user identification engine 1008 can use the portion of the identifying information and any other suitable information (e.g., accessed from the EMPI 920) to determine other identifying information (e.g., name, SSN, etc.) associated with the dependent user. In this manner, the user identification engine 1008 can uniquely identify dependent users.

The outbound routing engine 1010 is configured to route messages destined for entities outside of the information exchange service bus 236. To this end, the outbound routing engine 1010 can include a plurality of outbound routing rules, at least some of which may be saved in the rules database 1020. Each outbound routing rule can include one or more preconditions, one or more assumptions, and/or one or more post-conditions relating to a type of message and/or use case. Thus, each outbound routing rule can include a collection of logic to determine to what entity the message should be routed. The outbound routing engine 1010 is also configured to save a record of the routing of the outbound message to the record database 1024. The record can include details about the routing. The outbound routing engine 1010 can also provide for the actual routing of the messages, including making changes to the messages to ensure that they are delivered to the appropriate destination entities. In some example, the outbound routing engine 1010 provides for delivery of the messages to authorized destination entities as identified by the authorized entities database 1018. The outbound routing rules can be configurable to respond to new message types and new destination entities.

The inbound routing engine 1012 is configured to route messages destined for entities associated within or otherwise internally associated with the information exchange service bus 236. To this end, the inbound routing engine 1012 can include a plurality of inbound routing rules, at least some of which may be saved in the rules database 1020. Each inbound routing rule can include one or more preconditions, one or more assumptions, and/or one or more post-conditions relating to a type of message and/or use case. Thus, each inbound routing rule can include a collection of logic to determine to where the inbound message should be routed. The inbound routing engine 1012 is also configured to save a record of the routing of the inbound message to the record database 1024. The record can include details about the routing. The inbound routing engine 1012 can also provide for the actual routing of the messages, including making changes to the messages to ensure that they are delivered to the appropriate destination entities within the information exchange service bus 236 and/or associated with the information exchange service bus 236. In some examples, the inbound routing engine 1012 verifies whether the destination entities have been authorized. This can include accessing the authorized entities database 1018. The inbound routing engine 1012 is also configured to route messages to the staging database 1022. The staging database 1022 can function as an inbound queue for messages that cannot be delivered for some reason (e.g., an inbox associated with the destination entity is full, the destination entity is offline, the destination entity has not been authorized, or any other reason). The inbound routing rules can be configurable to respond to new message types and new source and destination entities.

The identification engine 1014 is configured to initiate listeners to detect messages as described herein. In some examples, the listeners are based on subscriptions initiated by source entities, destination entities, or otherwise established by an operator of the information exchange service bus 236. The identification engine 1014 is also configured to use the listeners to detect messages indicating occurrence of trigger events. The trigger events can be any suitable event that relates to a dependent user. In some examples, the trigger events relate to change in responsibility for the dependent user, and the messages are generated when the trigger events occur. For example, a trigger event can be a discharge event, transfer of care event, an order event, a user record adjustment event, a check in event, and any other suitable event. In some examples, the trigger events are defined by a predefined protocol of events such as the CDA protocol for message transfer. The identification engine 1014 is also configured to evaluate messages to identify data within the messages or otherwise related to the messages. For example, in an outbound message example, such data can include identification of an destination entity to receive a customized data package relating to the trigger event (e.g., a tailored message). In an inbound message example, such data can include identification of a source entity. In some examples, the message includes an identifier that the identification engine 1014 can use to identify the destination entity by referencing a table of destination entities. If the information exchange service bus 236 has not previously shared information with the destination entity or the destination entity is otherwise undeterminable, the authorization engine 1002 can be used to authorize the entity. In some examples, even when the destination entity is known, the authorization engine 1002 is still used to confirm that the destination entity is identified in the authorized entities database 1018.

Generally, the customization engine 1016 is configured to generate customized data packages such as tailored messages based on triggered events. In some examples, the customized data packages are a modified version of an existing data message such as a CCD message. In some examples, the customized data packages are entirely custom based on a set of generation rules, parameters, and other relevant data. The set of generation rules can be stored in the rules database 1020. The set of generation rules define the conditions for generating the customized data packages. The customized data packages can be generated and are particularized for professional users given particular dependent users. For example, when a dependent user is transferred from a first facility to a second facility, a customized data package can be generated and sent to a professional user at the second facility. The customized data package can include a historical record of encounters between professional users at the first facility and the dependent user. This can include status notes prepared by the professional users, updates to a user record of the dependent user, tests and results of tests, imaging, scans, and any other data relating to the dependent user. In some examples, the historical record can also include data from earlier encounters with the same or other professional users. This other data may be gathered when it is applicable to the receiving professional user. For example, if the receiving professional user is a specialist (e.g., cardiologist), the customized data package may include notes, tests, and images prepared by other similar specialists prior to the dependent user being transferred to the second facility.

The customized data package may also include summaries of the most relevant information given the dependent user and the professional user(s) at the second facility. For example, the set of generation rules constitute an importance hierarchy that defines what types of information is most relevant to which professional users given certain information about dependent users.

In some examples, the generation rules are evaluated given one or more input parameters. Such parameters can include, for example, sending professional user parameters (e.g., specialty, experience, location, type of practice, etc.), dependent user parameters (e.g., demographic information, condition, type of dependent user, location, etc.), receiving professional user parameters (e.g., specialty, experience, location, type of practice, etc.), type of receiving user (e.g., professional user, non-professional user (e.g., payer)), and other similar parameters. Use of these and other parameters by the customization engine 1016 may enable generation of customized versions of messages or data packages. Thus, for a single trigger event, multiple different customized data packages can be generated and sent to different users, professional and non-professional.

Figure 11:
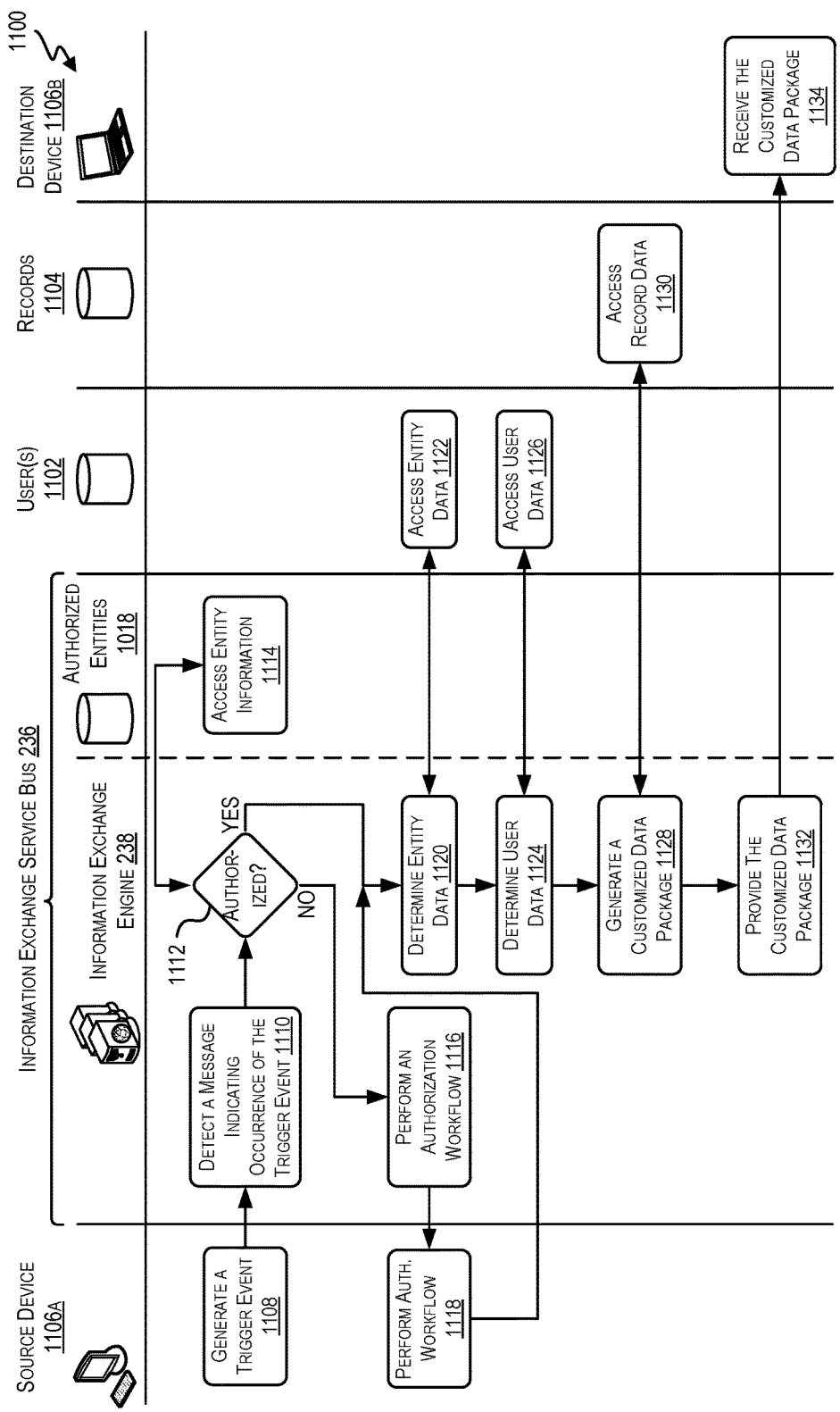
FIG. 11 is a flow diagram depicting example acts for implementing techniques relating to managing message flow and message customization as described herein, according to at least one example.
Figure 12:
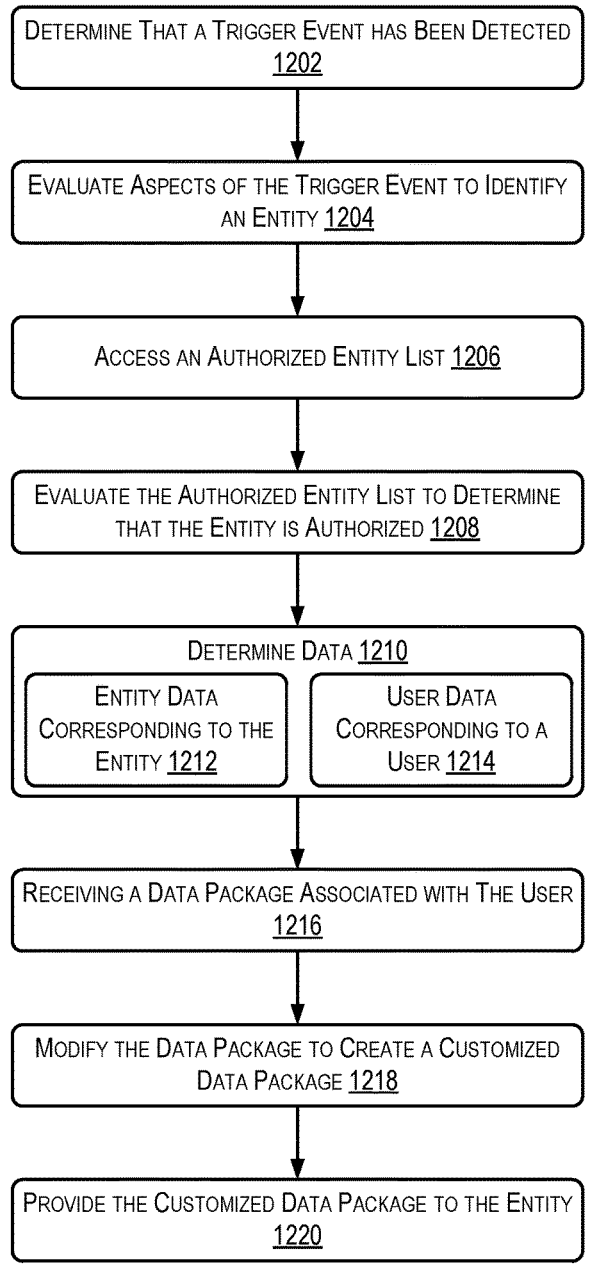
FIG. 12 is a flow diagram depicting example acts for implementing techniques relating to managing message flow and message customization as described herein, according to at least one example.
Figure 13:
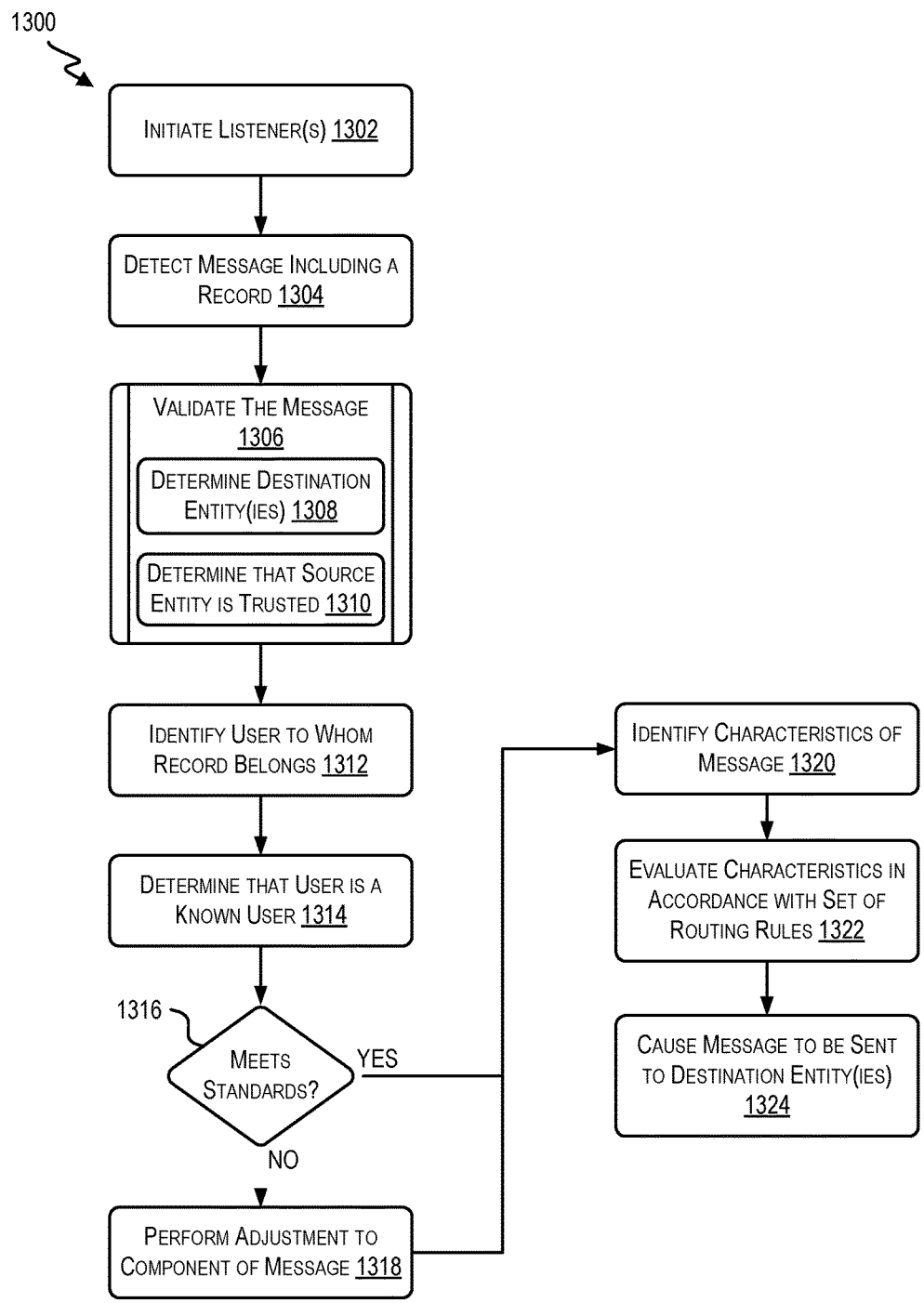
FIG. 13 is a flow diagram depicting example acts for implementing techniques relating to managing message flow and message customization as described herein, according to at least one example.

FIGS. 11, 12, and 13 illustrate example flow diagrams showing respective processes 1100, 1200, and 1300, as described herein. These processes 1100, 1200, and 1300 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium (e.g., storage devices), for example, in the form of a computer program comprising a plurality of instructions executable by one or more processors. The computer-readable storage medium is non-transitory.

FIG. 11 depicts the process 1100 including example acts or techniques relating to generating customized data packages (e.g., tailored messages) based on trigger events, according to at least one example. The process 1100 of FIG. 11 may be performed by the information exchange engine 238, the authorized entities database 1018, a user database 1102, a records database 1104, a source device 1106a, and a destination device 1106b.

The process 1100 begins at 1108 by generating a trigger event. This can be performed by the source device 1106a. The devices 1106 are examples of the components 906 described herein. Thus, in some examples, the source device 1106 is a user device and the trigger event is triggered in response to a professional user using the source device 1106. For example, such event can include making changes to a user record, adjusting a treatment plan of a dependent user, releasing the dependent user, transferring the dependent user, or otherwise making changes relating to responsibility or treatment of the dependent user.

At 1110, the process 1100 detects a message indicating occurrence of the trigger event. This can be performed by the information exchange engine 238 of the information exchange service bus 236. For example, detecting the message can include initiating one or more listeners to detect messages based on a set of message criteria. The message criteria may indicate the message as a type of message to be intercepted. In some examples, the information exchange engine 238 parses the message to determine details about the message that fulfill the message criteria. Detecting the message can also include detecting using the one or more listeners. In some examples, the trigger event corresponds to a change in responsibility for a user, such as a dependent user. Aspects of the message associated with the trigger event can be evaluated to identify a entity to receive a notification about the trigger event and a customized data package corresponding to the user.

At 1112, the process 1100 determines whether the entity is authorized to receive the notification about the trigger event. This may be a threshold determination. Determining whether the entity is authorized may include accessing entity information from the authorized entities database 1018 at 1114. In some examples, the entity information is organized into an authorized entity list that identifies entities that have previously agreed to comply with a set of guidelines regarding data security and that are authorized to receive communications corresponding to the user. The authorized entities database 1018 may be accessed using an identifier for the entity obtained during the evaluating of the message. In some examples, the information exchange engine 238 determines the entity on the fly based on information from the message. For example, even if the message does not indicate a particular entity to receive the notification and a customized data package, the information exchange engine 238 can nevertheless determine one or more entities to receive some version of a customized data package. For example, an identified first entity may be a second care facility to where the user is being transferred, a second entity may be a primary professional user who has an ongoing relationship with the user, but is not otherwise responsible for the user while the user is at either the first facility or the second facility.

If the answer at 1112 is NO, the process 1100 proceeds to 1116. At 1116, the process 1100 performs an authorization workflow. This may a sequence of operations to authorize an entity. In some examples, certain ones of the operations are performed in an automated manner. For example, emails or other messages may be sent to an agent of an operator of a provider network who is responsible for coordinating the authorization of entities. At 1118, the agent may use a user device (e.g., the source device 1106a or other device), software tools, and/or any suitable manual processes to obtain guarantees from the entity, perform evaluations of the entity's document handling procedures, evaluate credentials of the entity, and perform any other operations to authorize the entity. In some examples, this may include coordinating with agents of the entities. Once authorized, the process 1100 proceeds to 1120.

In some examples, the authorization workflow includes receiving an authorization request from the entity that requests authorization for the entity to receive data packages. The authorization may also include determining, based on the authorization request, that the entity is authorized to receive data packages. The entity may be associated with a unique entity identifier. The authorization workflow may also include adding the unique entity identifier to the authorized entity list.

If the answer at 1112 is YES, the process 1100 also proceeds to 1120. At 1120, the process 1100 determines entity data. As shown at 1122, this may include accessing entity data (e.g., entity features) from the user database 1102. The user database 1102 is an example of the localized record storage 916 or the centralized record storage 918. In some examples, the user database 1102 is stored in connection with the data store 226. In some examples, the entity data is associated with the entity and corresponds to one or more entity parameters included in a set of data package customization rules (e.g., a set of messaging rules). The set of data package customization rules may be stored in a rules database or otherwise stored in memory. The entity data may be descriptive of the entity. In some examples, the entity data includes a profile of the entity (e.g., demographic information, professional information, historical practice information, etc.). In some examples, the entity data defines a model of the entity. For example, the model may be predictive model that not only considers historical actions taken by the entity, but also predicts future actions based on the historical actions and other parameters associated with the entity. In some examples, the entity data includes a specialty identifier associated with the entity.

At 1124, the process 1100 determines user data (e.g., user features). As shown at 1126, this may include accessing user data from the user database 1102. In some examples, the user data is associated with the user and corresponds to one or more user parameters included in the set of data package customization rules. The user data may be descriptive of the user. In some examples, the user data includes a profile for the user (e.g., demographic information, condition, historical record information, etc.). In some examples, the user data includes a user identifier associated with the user and an assigned condition identifier corresponding to a condition assigned to the user.

At 1128, the process 1100 generates a customized data package (e.g., tailored message). A shown at 1130, this may include collecting record data (e.g., historical record material) by accessing the records database 1104. In some examples, the record database 1104 is a storage location associated with an electronic record storage system. The record data may describe one or more encounters between the user and other entities. For example, the records may be associated with an electronic record of the user. In some examples, the one or more encounters recorded by the record data occurred prior to detection of the trigger event. In this manner, the record data may be historical in nature. In some examples, generating the customized data package includes generating in accordance with the set of data package customization rules by compiling at least a portion of the record data based at least in part on the entity data associated with the entity and the user data associated with the user. In this manner, the customized data package is customized for the entity to receive the customized data package based on the entity and the user. A customized data package may include summaries of important or relevant aspects of the one or more encounters. In some examples, the information exchange engine 238 may include a natural language processing engine to parse notes in the record data to determine aspects to include in the summaries or to otherwise emphasize. In some examples, the customized data package is customized in the sense that it includes structured data and unstructured data that is different from, or at least arranged differently from, a conventional message for the given trigger event. In some examples, generating the customized data package includes modifying an existing data package generated by a different system (e.g., conventional CCD document). In some examples, generating the customized data package includes excluding, from the customized data package, a second portion of the record data that identifies a sensitive encounter between the user and the other entities. For example, the sensitive encounter may relate to a test or results of test administered to the user, notes of a professional user regarding behavioral conditions of the user, and other similar sensitive information.

At 1132, the process 1100 provides the customized data package. This may include putting the customized data package back on the information exchange service bus 236 and using the service-based approach for delivery of the customized data package to the destination device 1106*b* at 1134. In some examples, the destination device is associated with the entity. In some examples, the information exchange engine 238 retains a record that corresponds to the customized data package that was provided to the entity. This record can be used for end-to-end tracking and replay of the customized data package to the destination device.

FIG. 12 depicts the process 1200 including example acts or techniques relating to modifying data packages (e.g., messages) based on trigger events, according to at least one example. The process 1200 of FIG. 12 may be performed by the information exchange engine 238.

The process 1200 begins at 1202 by determining that a trigger event has been detected. In some examples, the trigger event corresponds to a change in responsibility for a user. In some examples, the change in responsibility for the user includes at least one of: (i) transfer of care for the user from a first facility to a second facility, (ii) termination of care for the user, or (iii) transfer of care for the user from a first entity to the entity.

At 1204, the process 1200 evaluates aspects of the trigger event to identify an entity. In some examples, the entity is to receive a notification about the trigger event and a customized data package (e.g., tailored message) corresponding to the user.

At 1206, the process 1200 accesses an authorized entity list. In some examples, the authorized entity list is stored in a central database. In some examples, the authorized entity list includes entities that have previously agreed to comply with a set of guidelines regarding data security and that are authorized to receive communications corresponding to the user. In some examples, the authorized entity list is a whitelist. In this example, evaluating the authorized entity list to determine that the entity is authorized to receive the customized data package further includes evaluating a blacklist. This may include confirming that the entity is not located on the whitelist.

At 1208, the process 1200 evaluates the authorized entity list to determine that the entity is authorized. In some examples, the entity is authorized to receive the customized data package corresponding to the user.

At 1210, the process 1200 determines data (e.g., features). This may include determining entity data (e.g., entity features) corresponding to the entity at 1212 and determining user data (e.g., user features) corresponding to the user at 1214. In some examples, the entity data corresponds to an entity parameter and the user data corresponds to a user parameter. The parameters may be included in the set of data package customization rules.

At 1216, the process 1200 receives a data package (e.g., a message) associated with the user. In some examples, the data package includes data (e.g., record material) describing one or more encounters between the user and other entities. The one or more encounters may have occurred prior to detection of the trigger event. The data package may be included in a message that was generated using a conventional protocol such as CDA. The data package may include other data describing historical record data associated with the user.

At 1218, the process 1200 modifies the data package to create a customized data package. In some examples, this may be performed in accordance with the set of data package customization rules and based on the entity data and the user data. Modifying the data package may include removing a first element from the data package, adding a second element to the data package, and/or generating a summary of a first portion of the data package. In some examples, the customized data package is a customized CCD.

At 1220, the process 1200 provides the customized data package to the entity. In some examples, providing the customized message to the entity includes providing the customized message to a message vendor that delivers the customized message to the entity.

In some examples, the process 1200 further includes retaining a record that corresponds to the customized message that was provided to the entity.

FIG. 13 depicts the process 1300 including example acts or techniques relating to dynamic shaping of messages, in accordance with at least one example. The information exchange engine 238 may perform the process 1300 of FIG. 13. The process 1300 begins at 1302 by initiating one or more listeners of a service bus. The one or more listeners can be configured to detect inbound messages from source entities.

At 1504, the process 1300 detects a message including a record. This can include using the one or more listeners to detect the message. The record can be associated with a dependent user.

At 1306, the process 1300 performs sub-process 1306 that includes 1308 and 1310. At 1308, the process 1300 determines destination entities. This can include one or more destination entities that are capable of processing the message. At 1310, the process 1300 determines that a source entity is authorized or otherwise trusted. This can include determining that the source entity is a trusted source entity based at least in part on accessing a registry of trusted source entities retained within a database. In some examples, each trusted source entity on the registry has previously agreed to comply with a set rules regarding protection of confidential user information.

At 1312, the process 1300 identifies a user to whom the record belongs. This can include identifying, based at least in part on the message, the user to whom the record included in the message belongs. In some examples, the user is a person identified by the message.

At 1314, the process 1300 determines that the user is a known user. This can include determining, based at least in part on an EMPI, that the identified user is a known user associated with a known user identifier.

At 1316, the process 1300 determines whether the message meets a set of standards. In some examples, the standards may relate to type of message, content of the message and/or other parameters.

If NO, the process 1300 proceeds to 1318 at which the process 1300 performs an adjustment to a component of the message. This can include at least one of removing a component of the message, adding a related component to the message, adding an unrelated component to the record, or performing any other suitable adjustment.

If YES, the process 1300 proceeds to 1320 at which the process 1300 identifies characteristics of the message. This can include identifying one or more characteristics of the message. The one or more characteristics can correspond to structure of the message, content of the message, or the user identified in the message.

At 1322, the process 1300 evaluates characteristics in accordance with a set of routing rules. The set of routing rules may be inbound routing rules or outbound routing rules and may indicate one or more conditions for routing of messages.

At 1324, the process 1300 cause the message to be sent to destination entities.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction (s) and/or data.

While the principles of the disclosure have been described above in connection with specific apparatuses and methods, it is to be clearly understood that this description is made only by way of example and not as limitation on the scope of the disclosure.

What is claimed is:

1. A system, comprising:
    an identification engine configured to:
        initiate one or more listeners to detect medical messages based on a set of message criteria, the medical messages generated by various first computing devices within a medical network;
        detect, using one or more second computing devices within the medical network, a medical message indicating occurrence of a trigger event, the trigger event corresponding to a change in medical responsibility for a patient; and
        evaluate content of the medical message indicating occurrence of the trigger event to identify a medical provider to receive: (i) a notification about the trigger event and (ii) a first tailored version of the medical message corresponding to the patient;
    an authorization engine configured to:
        access an authorized medical provider list stored in a central database; and
        evaluate the authorized medical provider list to determine that the medical provider is authorized to receive the first tailored version of the medical message corresponding to the patient, other authorized medical providers being authorized to receive other tailored versions of the medical message;
    a customization engine configured to:
        determine medical provider features in a medical provider database, the medical provider features being associated with the medical provider and corresponding to a medical provider parameter included in a set of messaging rules;
        determine patient features in a patient database, the patient features being associated with the patient and corresponding to a patient parameter included in the set of messaging rules;
        collect electronic health record data by accessing a record storage location associated with a record storage system, the electronic health record data describing one or more medical encounters between the patient and other medical providers, the one or more medical encounters occurring prior to detection of the trigger event; and
        generate the first tailored version of the medical message in accordance with the set of messaging rules by compiling at least a portion of the electronic health record data based in part on the content of the medical message, the medical provider features associated with the entity medical provider, and the patient features associated with the patient; and
    a routing engine configured to:
        provide the first tailored version of the medical message to the medical provider; and
        provide the other tailored versions of the medical message to the other medical providers.

2. The system of claim 1, wherein generating the first tailored version of the medical message comprises modifying an existing medical message generated by a different system.

3. The system of claim 1, wherein the routing engine is further configured to retain a record that corresponds to the first tailored version of the medical message that was provided to the medical provider.

4. The system of claim 1, wherein:
    the medical provider features comprise a specialty identifier associated with the medical provider; and
    the patient features comprise a patient identifier associated with the patient and an assigned condition identifier corresponding to a condition assigned to the patient.

5. The system of claim 1, wherein:
    the first tailored version of the medical message is a first tailored medical message;
    the customization engine is further configured to:
        determine second medical provider features associated with a second medical provider and corresponding to the medical provider parameter included in the set of messaging rules; and
        generate a second tailored version of the medical message in accordance with the set of messaging rules by compiling at least a different portion of the electronic health record data based in part on the second medical provider features associated with the second medical provider and the patient features associated with the patient; and
    the routing engine is further configured to provide the second tailored version of the medical message to the second medical provider.

6. The system of claim 1, wherein generating the first tailored version of the medical message in accordance with the set of messaging rules comprises excluding, from the first tailored version of the medical message, a second portion of the electronic health record data that identifies a sensitive encounter between the patient and at least one of the other medical providers.

7. The system of claim 1, wherein the authorization engine is further configured to:

receive an authorization request from the medical provider that requests authorization for the medical provider to receive medical messages;

determine, based at least in part on the authorization request, that the medical provider is authorized to receive the medical messages, the medical provider associated with a unique medical provider identifier; and add a unique entity identifier to the authorized medical provider list.

8. The system of claim 1, wherein the authorized medical provider list comprises medical providers (i) that have previously agreed to comply with a set of guidelines regarding data security and (ii) are authorized to receive communications corresponding to the patient.

9. A computer-implemented method, comprising:

determining that a trigger event has been detected, the trigger event corresponding to a change in medical responsibility for a patient;

evaluating aspects of the trigger event to identify a medical provider to receive (i) a notification about the trigger event and (ii) a first tailored version of a medical message corresponding to the patient;

accessing an authorized medical provider list stored in a central database;

evaluating the authorized medical provider list to determine that the medical provider is authorized to receive the first tailored version of the medical message corresponding to the patient, other authorized medical providers being authorized to receive other tailored versions of the medical message;

determining a medical provider feature associated with the medical provider and corresponding to a medical provider parameter included in a set of messaging rules;

determining a patient feature associated with the patient and corresponding to a patient parameter included in the set of messaging rules;

receiving a particular medical message associated with the patient, the particular medical message including electronic health record data describing one or more encounters between the patient and other medical providers, the one or more encounters occurring prior to detection of the trigger event;

modifying the particular medical message to create the first tailored version of the medical message in accordance with the set of messaging rules and based in part on content of the particular medical message, the medical provider feature, and the patient feature by:

removing a first content element from the particular medical message;

adding a second content element to the particular medical message; and/or generating a summary of a first portion of the particular medical message and adding the summary of the first portion of the particular medical message to the first tailored version of the medical message; and providing the first tailored version of the medical message to the medical provider.

10. The computer-implemented method of claim 9, wherein the authorized medical provider list comprises medical providers (i) that have previously agreed to comply with a set of guidelines regarding data security and (ii) are authorized to receive communications corresponding to the patient.

11. The computer-implemented method of claim 9, wherein the change in medical responsibility for the patient comprises at least one of: (i) transfer of care for the patient from a first medical facility to a second medical facility, (ii) termination of care for the patient, or (iii) transfer of care for the patient from a first medical provider to the medical provider.

12. The computer-implemented method of claim 9, wherein the first tailored version of the medical message is a customized continuity of care document (CCD).

13. The computer-implemented method of claim 9, wherein:

determining the medical provider feature is based on accessing a first database; and determining the patient feature is based on accessing the first database or a second database.

14. The computer-implemented method of claim 9, wherein:

the authorized medical provider list is a whitelist; and evaluating the authorized medical provider list to determine that the medical provider is authorized to receive the first tailored version of the medical message further comprises evaluating a blacklist.

15. The computer-implemented method of claim 9, wherein the first tailored version of the medical message comprises other data describing historical electronic health record data associated with the patient.

16. One or more computer-readable storage devices for storing computer-executable instructions that, when executed by one or more computer systems, configure the one or more computer systems to perform operations comprising:

determining that a trigger event has been detected, the trigger event corresponding to a change in medical responsibility for a patient;

evaluating aspects of the trigger event to identify a medical provider to receive (i) a notification about the trigger event and (ii) a first tailored version of a medical message corresponding to the patient;

accessing an authorized medical provider list stored in a data structure; and evaluating the authorized medical provider list to determine that the medical entity is authorized to receive the first tailored version of the medical message corresponding to the patient, other authorized medical providers being authorized to receive other tailored versions of the medical message;

determining a medical provider feature associated with the medical provider and corresponding to a medical provider parameter included in a set of messaging rules;

determining a patient feature associated with the patient and corresponding to a patient parameter included in the set of messaging rules;

collecting electronic health record data by accessing a record storage location associated with a record storage system, the electronic health record data describing one or more encounters between the patient and other medical providers, the one or more encounters occurring prior to detection of the trigger event;

generating the first tailored version of the medical message in accordance with the set of messaging rules by compiling at least a portion of the electronic health record data based in part on content of the medical message, the medical provider feature associated with the medical provider, and the patient feature associated with the patient; and providing the first tailored version of the medical message to the medical provider.

17. The one or more computer-readable storage devices of claim 16, wherein the authorized medical provider list comprises medical providers (i) that have previously agreed to comply with a set of guidelines regarding data security and (ii) are authorized to receive communications corresponding to the patient.

18. The one or more computer-readable storage devices of claim 16, wherein the operations further comprise retaining a record that corresponds to the first tailored version of the medical message that was provided to the medical provider.

19. The one or more computer-readable storage devices of claim 16, wherein providing the first tailored version of the medical message to the medical provider comprises providing the first tailored version of the medical message to a message vendor that delivers the first tailored version of the medical message to the medical provider.

20. The one or more computer-readable storage devices of claim 16, wherein:
- the medical provider feature comprises a specialty identifier associated with the medical provider; and
- the patient feature comprises a patient identifier associated with the patient and an assigned condition identifier corresponding to a condition assigned to the patient.

\* \* \* \* \*